United States Patent Office

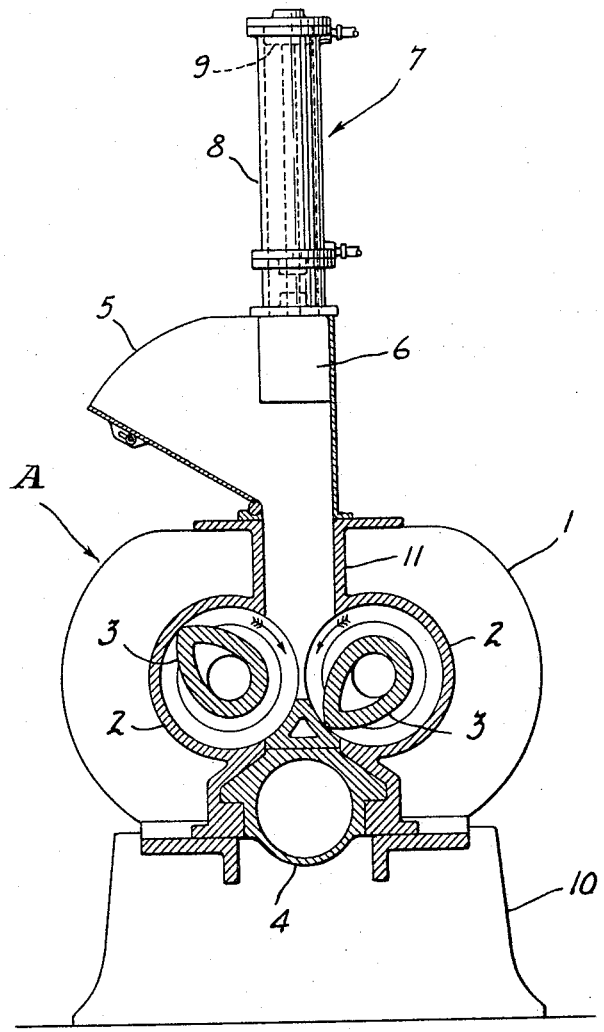

3,294,720
Patented Dec. 27, 1966

3,294,720
MASTICATING AND HEATING OF MIXTURES COMPRISING WET RUBBER CRUMB, CARBON BLACK AND SOFTENER
Adolph J. Beber and Glenn H. Orr, Akron, Ohio, assignors to The General Tire & Rubber Company, Akron, Ohio, a corporation of Ohio
Filed Dec. 26, 1962, Ser. No. 246,911
7 Claims. (Cl. 260—23.7)

This application is a continuation-in-part of copending application Serial No. 827,009, filed July 14, 1959, now abandoned.

The present invention relates to improved pneumatic tire tread compositions and methods of making the same in a Banbury mixer or similar internal mixer, and more particularly to a process of drying and mixing black masterbatches to improve the crack resistance, abrasion resistance and other physical properties of synthetic rubber tire tread compositions and to the tires produced by such process.

Heretofore, superior synthetic rubber tire tread compositions were prepared from conventional oven-dried SBR (GR-S) rubber which was mixed with carbon black in a Banbury mixer, but the generation of heat in the Banbury created a serious problem making it necessary to employ substantial periods of time for cooling or to remove the mixed black masterbatch from the Banbury one or more times during mixing of the compounding ingredients. Because of the excessive heat build-up and the difficulty in providing sufficient cooling, it was necessary to cool the rubber for a substantial period of time before adding the sulfur and accelerators. These curing agents were often mixed on the mill rolls as the last step in the mixing process, but this last step could also be performed in the Banbury mixer. The SBR rubber tire treads made prior to this invention from rubber compositions mixed in the Banbury mixer in this manner were at least as good as treads made by other methods, but the several different steps required to mix the material without premature curing increased the expense of this method.

Research has been carried on for many years to reduce the cost and improve the quality of SBR tire tread compositions and black masterbatches therefor and to simplify compounding of rubber compositions, but the problems have been very difficult to solve and progress has been slow, particularly because of the unreliability of laboratory tests.

After considerable research, we have discovered that the physical properties of SBR tire treads, particularly the crack resistance, can be greatly improved while at the same time making it easier to maintain reasonable temperatures during mixing of the compounding ingredients so that the number of mixing steps and/or the time required for cooling of the rubber during adding of the compounding ingredients can be reduced with the resulting savings. The invention also has great advantages since it permits drying of the rubber and mixing of the carbon black and other compounding ingredients simultaneously at the polymer plants, making it easier to prepare different types of masterbatches, easier to handle materials of low Mooney viscosity, and easier to package the rubber. The fire hazards, lack of versatility and cleaning problems inherent with oven driers are avoided, and all of the advantages of black masterbatches are obtained.

We have discovered that, for some reason, synthetic rubber tire treads have properties, such as abrasion resistance and resistance to cracking, which are greatly improved if the wet rubber crumb or coagulum obtained at the polymer plant has its moisture content mechanically reduced to less than 20 percent (i.e., in a dewatering screw), is mixed with reinforcing carbon black and other compounding ingredients, and is dried by mastication in an internal mixer, such as a Banbury mixer, under the proper conditions. Such properties cannot be obtained by drying the rubber in an oven, by adding water to the dried rubber before adding the carbon black and/or processing oil, or by adding oil and carbon black simultaneously to dried rubber.

According to the method of this invention, about 30 to 90 parts of fine reinforcing furnace carbon black are added to 100 parts (dry weight) of butadiene-styrene (SBR) polymer in the form of a wet, freshly coagulated, rubber crumb in a Banbury mixer after the moisture content of the crumb (which is initially greater than 30% and usually greater than 40%) has been mechanically reduced materially (i.e., reduced at least 50%) in said mixer or in a dewatering screw or the like. The mastication in the Banbury is preferably effected at a rotor speed of about 50 to 150 revolutions per minute and a pressure of about 60 to 120 pounds per square inch (i.e., 100 to 120 p.s.i.) to disperse the carbon black and dry the rubber rapidly.

The preferred method of this invention is to disperse all of the compounding ingredients except the accelerators and curing agents in the rubber in a single mixing stage in the Banbury mixer before the rubber tire composition is dried and discharged from the mixer. Thus, the carbon black, processing oil, zinc oxide and other compounding ingredients may be added while the moisture content of the rubber is 5 to 15 percent.

After the synthetic rubber tire composition of this invention is mixed and dried in the Banbury mixer, it has properties quite different from conventional black masterbatches. One unusual result of the method of this invention is that the rubber composition has less tendency to heat up during mastication with zinc oxide, stearic acid, antioxidants and other conventional compounding ingredients, making it possible to mix the sulfur and accelerators at the same time the other compounding ingredients are mixed with the black masterbatch. This eliminates the conventional two-stage method wherein the black masterbatch is mixed with the various compounding ingredients in a first mixing stage, the mixture is allowed to cool, and the curing agents are thereafter added in a second mixing stage. The present invention thus materially reduces the time required for preparing the curable rubber tire composition while at the same time improving its quality. The overall cycle time may be reduced as much as one-third using the process of this invention.

As pointed out in application Serial No. 827,009, it is feasible to dry high Mooney rubber compositions in 3 to 6 minutes and to complete mixing of a tire tread composition in a very short period of time. The carbon black is preferably added about ½ to 2 minutes after the initial addition of the wet crumb to the Banbury mixer, and the moisture content of the rubber is usually reduced to less than 10% in no more than about one minute. The addition of carbon black during the last portion of the drying cycle greatly speeds up the drying of the rubber so as to minimize the overall drying time. The pressure on the weight of the Banbury is usually reduced to permit the addition of the carbon black, and good results are obtained if it is permitted to float under its own weight without any additional pressure for about one-half to one minute after the carbon black is added before the high pressure is applied to the ram.

The mechanical drying process of the present invention is particularly advantageous since it permits economical production of premixed rubber compositions (or masterbatches) which contain all of the necessary compounding ingredients, except the sulfur and accelerator, without the necessity for an additional Banbury mixing operation. This is particularly advantageous for small manufacturing companies since rubber tire compositions of improved quality can be produced by mill mixing the sulfur and the accelerator with the premixed rubber composition without the necessity for the usual 2-stage Banbury mixing procedure. Also there is less tendency for the rubber to overheat during such mill mixing.

Road tests show that tire treads made according to the method of this invention have greatly improved abrasion resistance and crack resistance. Since the improvements in physical properties are accompanied by many other advantages in manufacture, the method of the present invention has great importance commercially. Because of its versatility and economy, the method of this invention may be preferred by many rubber manufacturers even if latex masterbatching techniques can be improved to the point where the abrasion resistance or other physical properties of the treads are equal to or superior to those made by this invention. It has several advantages over latex masterbatching methods because of the ease of adding the carbon black, the ease of changing formulas, the accuracy of measuring and the ability to change readily from staining to nonstaining materials.

An object of the present invention is to provide abrasion resistant pneumatic tire treads having high resistance to cracking.

A further object of the invention is to provide a simple, versatile and inexpensive method of making black masterbatches of high quality for use in tire treads.

Another object of the invention is to reduce the overheating of rubber during mixing of the compounding ingredients so that most or all of the compounding ingredients of the tire composition can be added in one pass through the Banbury mixer.

Another object of the present invention is to provide a method of making black masterbatches in which all of the compounding ingredients except the curing agents are mixed in one pass through the Banbury mixer.

A further object of the invention is to provide a simple method of making high quality, rubber tire compositions wherein liquids, such as processing oils, may be mixed with the rubber at the same time the carbon black is being dispersed.

Other objects of the invention are to provide a method of drying rubber without substantial loss of antioxidants, volatile oils or other ingredients and to provide a tread rubber with extremely low ash content.

Other objects, uses and advantages of the present invention will become apparent to those skilled in the art from the following description and claims.

The figure is a vertical sectional view on a reduced scale with parts omitted showing an internal mixer suitable for performing the method of the present invention.

The drawing shows a conventional Banbury mixer A capable of performing the method of this invention and similar to a conventional No. 11 Banbury mixer. The mixer A may also be constructed like the Banbury mixer shown in United States Patent No. 2,994,100 or United States Patent No. 2,972,774. Such an internal mixer has been known and used extensively in the rubber industry for many years for masticating raw or uncured rubber or preparing curable rubber compositions. The general construction is described, for example, in Banbury Patent No. 1,881,994 and improved versions of this machine have been in use many years and are well understood by those in the rubber industry without further description. Detailed descriptions of modern Banbury machines will be found in "Machinery and Equipment for Rubber and Plastics" (vol. 1, pp. 75 to 79, copyright 1952, India Rubber World) and elsewhere.

The Banbury mixer A comprises a housing 1 having a base 10 and two semi-cylindrical troughs 2 which receive the motor-driven rotors 3. As herein shown, the bottom portion of the housing is opened and closed by a power-operated sliding discharge door 4, but it will be understood that a conventional drop door may also be used. A floating flat-bottom weight 6 is provided which is operated by a pneumatic ram motor 7 having a cylinder 8. The piston 9 slidably mounted within the cylinder is rigidly connected to the weight 6 to raise and lower the same and permits application of a constant pressure up to 150 pounds per square inch when the weight 6 is located in the throat portion 11 of the housing. The rotors 2 may be driven in opposite directions as indicated by the arrows at constant speeds up to 120 revolutions per minute or so. The rotors 3 and the door 4 are cored for circulation of water or steam. The housing 1 may also be provided with conventional passages or spraying means for circulation of water or steam.

Tire manufacturers customarily employ a Banbury mixer to mix an oven-dried black masterbatch with the compounding ingredients in one mixing cycle and thereafter to mix the curing agent and accelerator in another cycle. Such a Banbury mixer would probably be operated at a speed in the neighborhood of 30 or 40 revolutions per minute. The Banbury mixer used in the present invention preferably operates at a much higher speed. A higher pressure is also employed and external heating may also be employed to facilitate the build-up of heat within the Banbury mixer and to shorten the time of the drying cycle.

The present invention relates to treatment of synthetic rubbers, such as rubbery copolymers, produced by polymerizing a material comprising a major proportion of a conjugated diolefin, such as a butadiene, having up to eight carbon atoms with a minor proportion of one or more resin-forming materials containing at least one unsaturated group, such as styrene or acrylonitrile. The invention is particularly applicable to SBR (GR-S) polymers which usually are derived from 70 to 75% butadiene and 30 to 25% styrene. Such SBR rubbers may be made by the redox method and polymerization is usually carried on at low temperatures not in excess of 10° C., such as 0° C. or 5° C., as is well known in the art.

The term "GR-S" is used herein as in parent application Serial No. 827,009 to describe butadiene-styrene rubbers even though it has been superseded by the equivalent term "SBR" in recent years.

An aqueous emulsion of the synthetic rubber elastomer may be coagulated in the conventional manner and the solids may be separated out and washed to obtain an unmasticated washed coagulum (wet crumb) having a moisture content of 30 to 200% based on the weight of the polymer. Coagulation may be accomplished, for example, by mixing the latex with a substantial quantity of salt solution under conditions of turbulence and thereafter incorporating acidic material, such as sulfuric acid, acetic acid or the like, to change soap to fatty acid. This method, or any other suitable method, may be used to produce the wet rubber crumb. A method for making oil-extended rubber crumb is disclosed, for example, in United States Patent No. 2,915,489. The moisture content of the wet crumb may be readily reduced to about 15 to 25% in a dewatering screw which squeezes the water out of the rubber crumb. The moisture content may also be reduced mechanically without masticating the rubber before being treated by the method of this invention by use of an extruder as is well understood in the art.

The washed coagulum or wet rubber crumb produced in polymer plants is well known, and it is conventional to remove water by passing the crumb through a drier to reduce the moisture content to less than 1%. In some cases, extruders are used to remove some of the water before the crumb enters the driers. The present invention eliminates drying of the wet crumb in stationary driers and contemplates placing the wet crumb in a Banbury mixer or similar internal mixer before the material has been masticated or subjected to drying heat.

Suitable antioxidants may be added to the coagulum in the polymer plant before the wet crumb enters the Banbury, but it will be understood that such antioxidants may be added in the Banbury during or prior to mastication of the rubber.

The wet crumb may be placed in the Banbury mixer immediately after the coagulation without any washing; but it is preferable to wash the material and filter it before drying it in the Banbury mixer. After washing it may, for example, be placed in an Oliver filter which can reduce its moisture content to less than 50%. The rubber may also be squeezed or passed through a dewatering screw to reduce its moisture content materially (i.e., 50% or more). The reduction in moisture content below 50% by mechanical means prior to Banbury drying reduces the time required for the drying cycle in the Banbury, but does not substantially improve the quality of the rubber produced.

Drying of the rubber in the Banbury mixer is more difficult where the coagulated crumb has a pH greater than 7 since it is more soapy and slippery. The time required for drying in the Banbury mixer can be reduced by lowering pH slightly below 7. In this manner it is sometimes possible to reduce the drying time from 6 minutes to less than 5 minutes. In view of this, the pH of the material should be 2 to 6 and preferably about 4 to 6. The acidity should not be increased too much because of the tendency to corrode the Banbury mixer. If the pH of the slurry after coagulation is 4 to 6, then it is not necessary to adjust the pH.

The wet coagulated crumb formed at the polymer plant may be placed in the Banbury mixer A when its moisture content is 30 to 60%, or even higher, but it is usually more practical to add to the Banbury wet crumb whose moisture content has been reduced to about 10 to 25% by a dewatering screw or similar mechanical device.

The method of this invention is preferably performed in a Banbury mixer, but it may also be performed in similar internal mixers capable of operation at high speeds and high pressures. It is desirable to employ a flat-bottom weight similar to the weight 6 shown herein and to provide sufficient clearance between the sides of the weight and the cylinder in which it reciprocates to permit escape of the water and steam. In performing the method of this invention, the rotors of the Banbury mixer should generally be rotated at a speed of 50 to 150 r.p.m. and the pressure on the ram should be 60 to 120 p.s.i. Good results can be obtained, for example, when the rotor speed is 80 to 100 r.p.m. and the pressure is 60 to 80 or 80 to 100 p.s.i. It will be understood that the pressure mentioned above may be reduced for short periods of time to permit the escape of high pressure gases or to permit addition of carbon black or the various compounding ingredients as will be explained in more detail hereinafter. A reduction in pressure is not necessary when adding liquid ingredients which may be pumped into the mixer.

While it is desirable to reduce the moisture content more than 50% with a dewatering screw or the like, to a low value (i.e., to less than 20%), wet SBR crumb having a moisture content greater than 30% may be dried very rapidly in a Banbury mixer capable of operation at the high speeds mentioned above. When such wet crumb has been masticated for a short period of time, which may be less than 30 seconds, water will gush up around the weight 6, and shortly thereafter steam and hot water will erupt around the ram as a geyser, the water flowing out through any openings in the Banbury mixer. If desired, the mixer may be provided with special means for removing the excess water (see, for example, Patent No. 2,972,774). The drying is usually very rapid and the moisture content of the wet crumb is usually reduced from more than 40% to 10% or less in a period of time less than 1 minute. The carbon black is added about ½ to 2 minutes after the initial mastication of the wet crumb and preferably 0.5 to 1.5 minutes after such initial mastication while the moisture content is 5 to 15% of the total weight of polymer and carbon black. The carbon black is preferably added while the moisture content is 5 to 10% of the total weight of polymer and carbon black in the mixture. It is undesirable to add the carbon black when such moisture content is greater than 15%. Good results are obtained if the carbon black is added while the moisture content is about 5 to 15% of the total weight of the polymer, but the use of large amounts of carbon black or oil permits addition while the moisture content is somewhat higher based on the polymer (i.e., 20%).

If the moisture content of the wet crumb added to the Banbury is already reduced to 20 or 25%, then it is not essential to reduce the moisture content below 15% before adding the carbon black. Good results can be obtained adding the carbon black to wet SBR rubber crumb having a moisture content of 15 to 20% before said crumb is masticated in the Banbury mixer, and satisfactory results may often be obtained following such procedure when the moisture content of the wet crumb is as high as 25%, but some of the black may be lost during the initial portion of the drying cycle. When the moisture content is as high as 20 or 25% it is preferable to employ dry carbon black, but it will be understood that high quality SBR tread rubber may be produced when reinforcing carbon black is employed having a substantial moisture content.

Since the forming of carbon black into pellets usually results in pellets having high moisture content, it is economical to omit the drying of the pellets and to use the pellets in wet form. It is preferable to employ wet carbon black pellets for this reason, particularly when the moisture content of the wet crumb is in the range of 5 to 15% at the time of addition of the carbon black.

The carbon black pellets may be added while packed in plastic bags as disclosed in United States Patent No. 2,617,782.

In order to produce satisfactory tire treads by the method of this invention, it is necessary to employ fine reinforcing carbon blacks such as HAF (high abrasion furnace), ISAF (intermediate super abrasion furnace), or SAF (super abrasion furnace) carbon black or mixtures of different carbon blacks which increase the tensile strength of the cured rubber composition substantially above 2000 pounds per square inch and preferably above 2500 pounds per square inch. Excellent results are obtained when using fine reinforcing furnace carbon blacks having an average particle size of 10 to 40 millimicrons and a surface area of 70 to 180 square meters per gram. About 30 to 90 parts by weight of such carbon black is employed for every 100 parts (dry weight) of the synthetic rubber polymer. It is usually preferable to employ about 40 to 80 parts of reinforcing furnace carbon black per 100 parts of SBR polymer (or per 100 parts of polymer plus oil if oil is present). The carbon black may be added in dry form as pellets or may be packaged as disclosed in United States Patent No. 2,617,775 or United States Patent No. 2,716,782. The dry carbon black reduces the time required for drying in the Banbury mixer.

The carbon black may be pelletized by either a dry or a wet process as pointed out in U.S. Patent No. 3,005,725. A suitable method is disclosed in U.S. Patent No. 2,949,349.

It is sometimes desirable, immediately after the addition of the carbon black, to lower the weight 6 and to allow it to float on the rubber under its own weight without the application of pressure to the ram. Floating the weight about ½ to 1 minute improves the dispersion of the rubber and also facilitates escape of the pressure gases. It will be understood, however, that such floating is not essential and that reduction of the ram pressure to facilitate escape of gases is not necessary. The full pressure of 50 to 120 p.s.i., as the case may be, may be applied immediately after the carbon black has been added.

Oven-dried latex masterbatches always have several times the ash content of Banbury-dried masterbatches made according to the present invention and provide tire treads inferior to those made from Banbury dried masterbatches. The superior rubber produced by the Banbury drying method of this invention also facilitates mixing of all of the ingredients in a single mixing cycle as disclosed in applicants' copending application Serial No. 827,009, filed July 14, 1959.

At the present time SBR latex-black masterbatches provide a substantial part of the synthetic rubber used in rubber tire manufacture due to the convenience of such masterbatches as compared to "white" SBR rubber. Such masterbatches have been employed for many years due to the reduction in mixing time at the factory, as compared to that required for mixing the carbon black with the "white" rubber in the factory Banbury mixer prior to addition of other compounding ingredients. The latex-black masterbatches, unlike "white" rubber, are not too sticky for packing and can be handled rather easily. The method of making black masterbatches according to the present invention can be used at the polymer plant so as to have many of the advantages of conventional latex masterbatching. It has advantages over latex masterbatch procedures particularly since there is no waste of rubber when the proportions of carbon black or other ingredients are varied, since there is no cleaning required to change from staining to non-staining rubbers, and since it is extremely easy to control the amount of carbon black added when the recipes are changed.

The method of this invention eliminates the need for forming a carbon black slurry prior to coagulation of the latex and thereby reduces the cost of the rubber. In the slurry process, the carbon black slurry is mixed with the latex and the materials are co-coagulated to produce the wet crumb which contains the carbon black. This wet crumb may then be dried in the Banbury mixer with or without oil or other organic liquid materials to produce a black masterbatch, but the cost of such masterbatch is considerably higher than that of a masterbatch produced according to the method of this invention.

Changes in the recipes during continuous latex masterbatching results in small amounts of "twilight" material or "off-spec" rubber having slightly different amounts of carbon black than called for by the recipe. This is the natural result of the employment of slurries of carbon black and pipes carrying the slurry through meters. Such metering makes it difficult to compound the rubber accurately since the concentration of slurry must be carefully checked to obtain the proper dry weight of carbon black. The method of this invention also has other advantages over latex masterbatching plus oven drying since it makes it relatively easy to dry soft taffy-like rubbers such as GR–S 1010 or similar low Mooney rubbers having a raw Mooney viscosity of 20 to 30 which are almost too soft and sticky to pass through conventional drying ovens or to package after drying.

The housing of the Banbury mixer provides a closed receptacle so that the rubber may be masticated for several minutes while being subjected to substantial pressure. The mastication increases the temperature to about 200° to 300° F. in a few minutes. The overall time required for drying the wet SBR rubber crumb and mixing the crumb with carbon black is usually no greater than six minutes even when the moisture content of the wet crumb is as high as 40%, and is substantially less than six minutes when the moisture content is substantially lower initially. When the moisture content of the wet crumb is in excess of 30%, the carbon-black-reinforced rubber composition is preferably discharged from the Banbury mixer 3.5 to six minutes after the initial addition of the wet crumb to the mixer. A pressure of at least 60 pounds per square inch and preferably 70 to 100 pounds per square inch is applied to the rubber by the ram throughout at least 80% of the drying cycle and preferably for at least three minutes. The rotors are preferably operated at a constant speed throughout the drying cycle, and this speed is preferably about 50 to 150 revolutions per minute. The drying time is reduced by increasing the speed of the rotors, but there is little advantage in increasing the speed above 125 r.p.m. since the reduction in drying time is not very great. Drying time is reduced so little by increasing the pressure above 120 p.s.i. that it is not practical to employ a higher pressure. The speed and pressure employed in the Banbury mixer are preferably sufficient to reduce the moisture content of wet SBR rubber crumb from more than 40% to less than 10% in ½ to 1 minute and to reduce the moisture content to less than 1% in 3 to 6 minutes. The size of the batch may be selected to obtain the most efficient mixing operation.

When the moisture content of the wet crumb is reduced to 12 to 20% in a conventional dewatering screw, the time required to reduce the moisture content below 10% is very small. In order to minimize the time for the cycle in such a case, it is usually preferable to add the carbon black to the wet crumb before masticating the crumb in the Banbury. This eliminates elevating of the ram and opening of the door after initial drying of the wet crumb.

When drying rubber in the Banbury mixer it is desirable to heat the mixer, for example, by passing steam at a temperature of about 300° to 400° F. through the passages of the housing 1 and the rotors 3 to reduce the drying time. Steam is also passed through the passage in the door 4, but the temperature thereof is preferably about 50° F. below the temperature of the other heating steam so that the door will not expand and be prevented from opening. If carbon black and other compounding ingredients (other than curatives) are added to the wet rubber crumb before it is masticated, dried and discharged, the temperature of the rubber is preferably 320° to 375° F. at the time of discharge.

If the wet rubber crumb has a moisture content of 30 to 60% when initially added to the Banbury mixer, the preferred method of the present invention is to drive the rotors 3 at a constant speed of 50 to 150 r.p.m. while applying a pressure of 50 to 100 p.s.i. so as to reduce the moisture content of the SBR rubber from 30 to 60% to less than 10% in ½ to 1 minute and then to add the 30 to 90 parts phr. of fine reinforcing furnace carbon black, such as HAF or SAF, while the moisture content of the rubber in the Banbury mixer is about 5 to 10%. The pressure may be reduced about ½ minute to permit addition of the carbon black. Thereafter the pressure is again increased as desired say to 50 to 100 p.s.i. and such pressure is preferably applied at least 3 minutes from the time the wet crumb is initially added to the time that the mixed rubber is discharged from the mixer.

The mastication is continued to cause the temperature to rise above 220° F. During the mixing and after the temperature is between 200° and 300° F. there may be added 2 to 8 parts of zinc oxide, 1 to 3 parts of stearic acid, and 5 to 20 parts of hydrocarbon mineral oil or other suitable softener per 100 parts of SBR polymer so that these materials are thoroughly mixed before the SBR rubber composition is discharged from the mixer. If necessary, the pressure may be reduced one or more times to facilitate such addition, but this is usually not necessary since the liquid materials can be forced into the Banbury by suitable pumping means without reduction in pressure.

This procedure may be employed with SBR polymers having a Mooney viscosity of 20 to 200 or higher. SBR polymers having a raw Mooney viscosity of 80 to 200 or more are generally dried while in admixture with an amount of oil sufficient to reduce the compounded Mooney viscosity to 40 to 90. By employing this process it is possible to dry the wet crumb at the polymer plant while at the same time producing a rubber composition according to a specified formula, which composition requires only the addition of sulfur and accelerators at the factory.

The GR–S rubber compositions made by the method of this invention usually contain 2 to 8 parts of zinc oxide, 1 to 3 parts of stearic acid, 1 to 4 parts of sulfur, and 0.4 to 2 parts of a suitable accelerator, such as Altax, Santocure or the like. The amount of process oil or other softener employed is generally increased as the Mooney viscosity of the polymer increases.

The present invention permits the manufacture of Banbury-dried black masterbatches at the polymer plants consisting of GR–S polymer mixed with carbon black and plasticizing oil which are somewhat similar to conventional latex masterbatches. The preferred method of making such masterbatches from wet crumb is to add 30 to 90 parts phr. of HAF or ISAF carbon black to the GR–S rubber in the Banbury while the moisture content is about 5 to 15% and to continue the mastication until the temperature is about 320 to 375° F. and the moisture content is less than 1% and preferably no greater than 0.5%. When a masterbatch prepared in this manner is received in bales at the factory, it may be placed in a Banbury mixer or other closed receptacle and subjected to mastication under a pressure of 60 to 100 p.s.i. while maintaining a constant rotor speed of 50 to 150 r.p.m. The sulfur and accelerator are preferably added while the temperature is below 250° F. so as to produce a curable rubber composition in the Banbury mixer, and this composition is masticated for 1 to 4 minutes to cause the temperature of the rubber to increase to about 200 to 270° F. before the material is discharged from the Banbury mixer. It is, therefore, extremely easy to prepare curable rubber compositions from the Banbury-dried carbon black masterbatches. The zinc oxide, stearic acid, oil, sulfur and accelerator may be added to the black masterbatch to produce a finished tire composition during a single stage of mixing in the Banbury mixer without excessive heating of the rubber even though a normal amount of cooling is effected in the mixer.

The method of the present invention may be employed with GR–S polymers having a raw Mooney viscosity from about 20 to 200 or so, and excellent results are obtained when the Mooney viscosity of the polymer or polymer plus hydrocarbon oil is about 20 to 100. Where the polymer has a Mooney viscosity above 100, it may be coagulated in the presence of a suitable oil, such as Philrich 5, Sundex 53 or the like, so that the rubber-oil masterbatch in the form of a wet crumb has a (dry) compounded Mooney viscosity of 40 to 90.

Drying of the rubber in the Banbury mixer in a short period of time is possible even when the Mooney viscosity is as low as 20 or 30. The process of the present invention squeezes out excess water so drying time is not a function of moisture content above the 15% or so that remains after the initial smear or squeeze working period. Tests have indicated that the method of this invention permits drying of GR–S rubber in less than 6 minutes even when the moisture content is greater than 50%. This is also true with many SBR rubbers even when the pH is above 7. In many cases the drying time is less than 4 minutes even with moisture contents approaching 50%.

Heretofore, the highest quality SBR tire tread compositions have contained 100 parts by weight of a butadiene-styrene (SBR) copolymer with a Mooney viscosity of at least 100, about 30 to 90 parts by weight of a reinforcing carbon black, such as HAF black, about 5 to 60 parts of a compatible plasticizing oil, about 2 to 8 parts of zinc oxide, about 1 to 3 parts of stearic acid, suitable amounts of sulfur and accelerator, and up to 5 parts of antioxidant.

A common and well known method for making these tire tread compositions comprised the steps of passing the washed coagulum of the SBR rubber copolymer through a dewatering screw to form a wet crumb with a substantial moisture content below 60% and preferably below 25%, reducing the moisture content of the rubber below 1% in an oven, thereafter dispersing the carbon black in the rubber in a first mixing cycle, cooling the rubber mixture (black masterbatch), adding all of the other compounding ingredients except the curing agents to the masterbatch in a second mixing cycle, cooling the rubber mixture, and thereafter mixing in the curing agents in a third mixing cycle at a temperaure below the vulcanization temperature. In order to obtain satisfactory dispersion of the carbon black in such a method, it was necessary to avoid adding any oil before the carbon black had been thoroughly dispersed in the rubber.

The present invention improves upon the conventional process by eliminating one of the mixing cycles, by eliminating oven drying, by reducing the overall time required to make the final tire composition, and by permitting addition of several parts of oil before the carbon black is dispersed in the rubber. Several parts of oil (i.e., 2 or 3 parts of Santoflex AW or Philrich 5) can be added during the first mixing cycle i.e., while the moisture content is about 2 to 15% of the total weight of the polymer and carbon black. All of the compounding ingredients, except the sulfur and accelerator, may be added during the first mixing cycle and are preferably added after the mastication of the rubber raises the temperature of the rubber above 220° F.

The Banbury-dried masterbatch of this invention is more readily applicable to open mill mixing than conventional masterbatches and provides more uniform processing, particularly when they contain all of the compounding ingredients except the curatives.

It is well known that oil interferes with dispersion of carbon black, and, for this reason, it has been customary to mix the carbon black thoroughly with the SBR rubber in the Banbury mixer before adding the oil. It has also been thought that water interferes with proper dispersion of carbon black and produces inferior tire compositions as pointed out in the article on pages 791 to 799 of Rubber Age (August 1961). However, a tire tread produced according to the present invention has excellent black dispersion and improved abrasion resistance even when both water and oil are present during dispersion of the carbon black. A superior tire tread is produced even when the oil, the reinforcing carbon black, and all of the other compounding ingredients except the curing agents (i.e., sulfur and accelerator) are mixed with the wet rubber crumb simultaneously in the Banbury mixer.

A series of rubber compositions A to D were prepared for testing according to the recipes indicated in Table I below:

TABLE I

| Composition | Parts by Weight | | | |
|---|---|---|---|---|
| | A | B | C | D |
| Masterbatch FB-3F | 212.5 | 212.5 | | |
| Masterbatch 1805 | | | | 212.5 |
| GR-S 1712 | | | 137.5 | |
| HAF Carbon Black | | | 75.0 | |
| Zinc Oxide | 3.0 | 3.0 | 3.0 | 3.0 |
| Stearic Acid | 2.0 | 2.0 | 2.0 | 2.0 |
| Diphenyl Ethylene Diamine | 1.0 | 1.0 | 1.0 | 1.0 |
| Santoflex AW | 1.0 | 1.0 | 2.5 | 1.0 |
| Softener (Resinex 100) | 7.0 | 7.0 | 4.0 | 7.0 |
| Oil (Philrich 5) | 6.0 | 6.0 | 7.5 | 6.0 |
| Accelerator (Santocure) | 1.2 | 1.2 | 1.2 | 1.2 |
| Curing Agent (Sulfur) | 2.0 | 2.0 | 2.0 | 2.0 |

In the above Table I, FB-3F is a Banbury mixed and dried black masterbatch prepared by adding 137.5 parts of GR-S 1712 wet crumb from the polymer plant (moisture content around 50% and pH around 6.0) to a No. 3D Banbury mixer as shown herein and adding 75 parts of HAF carbon black (Philblack O) after 0.5 minute in the Banbury drying cycle, the total drying time in the Banbury being 6 to 7 minutes. The Banbury mixer is heated at all times with steam at a temperature of about 350° to 400° F. During drying the rotor speed is constant at about 100 revolutions per minute. The pressure applied to the ram is about 80 pounds per square inch except for about 15 to 30 seconds during adding of the black and about 30 seconds thereafter (the weight being lowered and permitted to float without pressure about half a minute immediately after addition of the 75 parts of carbon black). The masterbatch is heated by mastication to a temperature of about 300° to 320° F. and dried in the Banbury to a moisture content of less than 1% before being discharged. The rubber is then carried directly to a pelletizer of the general type disclosed in U.S. Patent No. 2,614,290 which further reduces the moisture content to around 0.5% or less. The resulting pellets are then passed down a long conveyor to a baler and the black masterbatch is baled. The baled material is then stored a few days and used as indicated in Table I.

Masterbatch 1805 is also baled rubber dried in the same No. 3D Banbury mixer, but the carbon black is added in the polymer plant from an aqueous dispersion (slurry) prior to coagulation according to conventional latex masterbatching practice. Masterbatch 1805 is a conventional oil-black-masterbatch as sold commercially except that it is dried in a No. 3D Banbury mixer instead of in a conventional drying oven. This masterbatch is obtained as a wet unmasticated coagulated crumb with a moisture content of about 37% and a pH of about 5. This crumb is obtained after it has been washed with water and recovered from an Oliver Filter. This crumb contains the same proportions of oil, carbon black and high-Mooney GR-S polymer as Masterbatch FB-3F, that is 137.5 parts of GR-S 1712 (including 37.5 parts of Philrich 5) and 75 parts of HAF carbon black (Philblack O).

The wet crumb of the cold oil-black Masterbatch 1805 is placed in the No. 3D Banbury (heated by steam as above) and subjected to a ram pressure of 80 p.s.i. and a rotor speed of 100 r.p.m. for about 3 to 4 minutes to raise the temperature to about 300° to 320° F. and to reduce the moisture content from about 37% to less than 0.5% and is then passed through a pelletizer and baled like Masterbatch FB-3F.

GR-S 1712, a well-known cold-rubber oil masterbatch, is a mixture of 100 parts by weight of a copolymer of butadiene and styrene and 37.5 parts of Philrich 5 (a highly aromatic processing oil). The polymer is manufactured by emulsion polymerization at 41° F., using mixed soaps of rosin and fatty acids, a sugar-free iron-activated system, and a carbamate shortstop, approximately 1.25 percent of a staining stabilizer being added to the polymer during manufacture. GR-S 1712 is coagulated by the salt-acid procedure, the butadiene-styrene copolymer containing about 22.5 to 24.5 percent of bound styrene. The Mooney viscosity (ML-4) of the GR-S 1712 masterbatch (37.5 parts of oil) is about 45 to 65. It will be apparent that the copolymer itself has a Mooney viscosity (ML-4) of well over 120.

Santoflex AW is 6-ethoxy-1,2-dihydro-2,2,4-trimethyl quinoline and is employed as an antioxidant and ozone protector in the compositions A to D listed above.

Resinex 100, an asphaltum plasticizer, consists of a series of polymerized aromatic fractions with a specific gravity of 1.16 and a melting point of about 100 to 115° C. This non-toxic dark brown material has a faint aromatic odor, an acid number of zero, and a saponification number of zero. The Resinex of Table I may be omitted or may be replaced with various other softeners or processing oils as will be apparent to those skilled in the art.

Santocure is n-cyclohexyl-2-benzothiazole sulfenamide.

Masterbatch 1808 (SBR 1808) is a baled rubber which is dried in a Banbury mixer rather than in a conventional drying oven. This masterbatch is formed by masticating a wet crumb containing 137.5 parts of GR-S 1712 (a copolymer of butadiene and styrene containing 37.5 parts of highly aromatic processing oil per 100 parts of said copolymer), 75.0 parts of HAF carbon black (Philblack O), and 12.5 parts of process oil (Philrich 5).

The stiffness or viscosity of an uncured rubber is measured on a standard Mooney viscometer. The phrase "ML-4" designates a particular test used in determining the Mooney viscosity of the rubber wherein a large 1½ inch diameter rotor is used in conjunction with a test time of four minutes and a temperature of 212° F., the test being conducted by placing the material between the rotor and two stationary parts provided with an array of sharp points to hold the rubber. As the rotor of the Mooney viscometer turns, the rubber exerts an opposing torque which is measured, and the shearing strength is determined.

The mixing procedure for Compositions A, B and D is indicated in Table II below:

TABLE II

| | A | | B | | D | |
|---|---|---|---|---|---|---|
| | Time: Min., Sec. | Temp., °F. | Time: Min., Sec. | Temp., °F. | Time: Min., Sec. | Temp., °F. |
| Start | 0 | | 0 | | 0 | |
| Rubber Loaded | 1'10" | 150 | 1'40" | 145 | 40" | 170 |
| Resinex Added | 2'0" | 155 | 2'20" | 150 | 1'30" | 175 |
| Oil Added | 4'0" | 200 | 4'10" | 198 | 2'10" | 200 |
| Santocure Added | 5'30" | 200 | 5'20" | 200 | 3'50" | 198 |
| Discharged | 6'50" | 234 | 6'50" | 230 | 5'0" | 230 |

The temperatures in Table II are the readings on the Micromax pyrometer located in the No. 3D Banbury. Actual temperatures of the rubber are about 25° F. higher than those indicated. The actual discharge temperature for Compositions B and D are, therefore, about 255° F.

In Table II the expression "Rubber Loaded" indicates the addition of the masterbatch together with all of the sulfur, zinc oxide, stearic acid, diphenylethylene diamine and Santoflex AW. The first time indicated is the time at which the flat-bottom weight 6 of the ram is initially lowered. The time of lowering the ram after the addition of Resinex and Santocure is not indicated, but about 10 to 15 seconds is required for addition of each of these ingredients, the ram being lowered and subjected to full pressure immediately after such addition.

The physical properties of test specimens made from Compositions A to D and tested under identical conditions are indicated in Table III below:

TABLE III

|  | A | B | C | D |
|---|---|---|---|---|
| 300% Modulus: Min. Cure, 287° F.— |  |  |  |  |
| 20 | 500 | 600 | 375 | 175 |
| 30 | 750 | 960 | 600 | 375 |
| 45 | 975 | 1,075 | 800 | 675 |
| 60 | 1,050 | 1,125 | 900 | 825 |
| 90 | 1,075 | 1,125 | 975 | 950 |
| Tensile Strength (p.s.i.): Min. Cure, 287° F.— |  |  |  |  |
| 20 | 2,200 | 2,225 | 2,100 | 1,150 |
| 30 | 2,700 | 2,725 | 2,450 | 1,950 |
| 45 | 2,950 | 2,750 | 2,650 | 2,625 |
| 60 | 2,850 | 2,925 | 2,700 | 2,750 |
| 90 | 3,000 | 2,975 | 2,700 | 2,700 |
| Elongation (percent): Min. Cure, 287° F.— |  |  |  |  |
| 20 | 900 | 807 | 870 | 1,070 |
| 30 | 780 | 740 | 750 | 850 |
| 45 | 720 | 640 | 650 | 780 |
| 60 | 680 | 680 | 650 | 720 |
| 90 | 690 | 670 | 620 | 650 |
| Durometer Hardness: Min. Cure, 287° F.— |  |  |  |  |
| 20 | 47 | 49 | 49 | 45 |
| 30 | 50 | 54 | 50 | 48 |
| 45 | 56 | 55 | 53 | 49 |
| 60 | 54 | 55 | 54 | 51 |
| 90 | 55 | 56 | 55 | 51 |
| Tear Strength (p.s.i.): Min. Cure, 287° F.— |  |  |  |  |
| 20 | 357 | 399 | 374 | 264 |
| 30 | 322 | 336 | 392 | 307 |
| 45 | 280 | 345 | 340 | 314 |
| 60 | 287 | 324 | 330 | 390 |
| 90 | 303 | 303 | 360 | 304 |
| Mooney Viscosity (212° F.), 1.5-4 minutes | 58-51 | 63-56 | 61-55 | 45-40 |

*Example I*

In order to mix the Composition A, 212.5 parts by weight of dry baled Masterbatch FB-3F described above in big lump form is loaded into a conventional No. 10 Banbury mixer of the type shown in the drawings with 3.0 parts of zinc oxide, 2.0 parts of stearic acid, 1.0 part of diphenyl ethylene diamine, 1.0 part of Santoflex AW, and 2.0 parts of sulfur while the rotor speed is maintained at 80 revolutions per minute. This loading requires seventy seconds from the start as indicated in Table II, the weight 6 being lowered at this time and subjected to a pressure of 80 pounds per square inch. The mixer is cooled in the conventional manner, cooling water being passed through the housing and the rotors.

The temperature indicated by the Micromax pyrometer rises gradually from 150° F. to 155° F., and 2.0 minutes after said start the weight 6 is elevated and 7.0 parts of Resinex 100 are added. This addition requires 10 to 15 seconds and the weight 6 is then lowered immediately and subjected to the full pressure of 80 p.s.i. The temperature continues to rise gradually during the mastication and mixing; and, when the indicated temperature is 200° F., about 4.0 minutes after said start, 6.0 parts of Philrich 5 (oil) are injected into the rubber mix without reducing the pressure on the ram or lifting the weight. The temperature then levels off, and 5.5 minutes after said start the weight 6 is elevated to permit the addition of 1.2 parts of Santocure. This addition requires 10 to 15 seconds and the weight is then lowered and maintained at a pressure of 80 p.s.i., the temperature gradually increasing as the mastication continues. When the temperature indicated by the Micromax reaches 234° F., about 6 minutes 50 seconds after said start, the masticated curable rubber composition A is discharged through the sliding door 4. The actual discharge temperature of the rubber is about 260° F.

The curable composition A is then extruded in a standard extruder to conventional tread form and bias cut to form a smooth tread half as long as a conventional (360°) tread. Test samples of this composition A are cured at 287° F. for different times (20, 30, 45, 60 and 90 minutes, respectively) and are subjected to conventional tests, the results being indicated in Table III. The uncured Composition A has a raw Mooney viscosity with a large rotor after 1.5 minutes at 212° F. of 58. The Mooney viscosity (ML-4) after 4 minutes is 51.

*Example II*

The Composition B is mixed in the No. 3D Banbury mixer generally as in Example I, 212.5 parts by weight of dry Masterbatch FB-3F being loaded with 3.0 parts of zinc oxide, 2.0 parts of stearic acid, 1.0 part of diphenyl ethylene diamine, 1.0 part of Santoflex AW, and 2.0 parts of sulfur in 100 seconds. The weight is lowered 100 seconds after the start while the temperature is 145° F. and is raised at temperatures of 150° and 200° F. after 2 minutes 20 seconds and 5 minutes 20 seconds, respectively, to permit the addition of Resinex and Santocure. The Philrich 5 is injected (without moving the ram) at 4 minutes 10 seconds while the temperature is 198° F. The procedure is otherwise the same as in Example I, about 10 to 15 seconds being required for each addition of the Resinex or the Santocure while the ram is up and a similar period of time being required to add the Philrich 5 while the ram is down. The pressure of 80 p.s.i. is again applied whenever the weight 6 is lowered, and the rotor speed is constant at 100 r.p.m. The masticated curable Composition B is discharged through the door 4 and about 6.8 minutes after the start when the actual temperature of the rubber is about 255° F. (indicated temperature 230° F.).

The Composition B is then extruded to tread form as in Example I and cut to form a half tread. Again there is no difficulty in extruding the material, and the uncured treads are smooth. Samples cured at 287° F. for different periods of time and tested as in Example I give results as indicated in Table III.

*Example III*

In order to provide a control of known high quality for purposes of comparison, a rubber Composition C is mixed in the No. 3D Banbury using a conventional mixing procedure. The first step is to add 137.5 parts of conventional oven-dried GR-S 1712 (100 parts GR-S polymer and 37.5 parts oil) of the type sold in bales commercially to the Banbury mixer with 75.0 parts of Philblack O, 3.0 parts of zinc oxide, 2.0 parts of stearic acid, 2.0 parts of diphenylethylene diamine, 2.5 parts of Santoflex AW, 4.0 parts of Resinex 100, and 7.5 parts of Philrich 5.

This material is mixed in the conventional manner for 5 minutes and is then discharged and cooled. The rubber is then placed back in the No. 3D Banbury mixer and 1.2 parts of Santocure and 2.0 parts of sulfur are added per 100 parts of GR-S polymer as indicated in Table I. The material is mixed for 2.4 minutes until the (Micromax) indicated temperature is 220° F. and the resulting Composition C is then discharged and passed to an extruder as in Examples I and II where it is formed into a conventional tread strip. The strip is bias cut to form a series of half treads of the same size as the half treads made from Compositions A and B.

Samples of the (control) Composition C are cured at 287° F. for different periods of time and are tested like the samples previously described in Examples I and II, the results being shown in Table III.

*Example IV*

The Banbury-dried oil-black Masterbatch 1805 is added to the No. 3D Banbury and mixed generally as in Examples I and II at a rotor speed of 80 r.p.m. and a pressure of 80 p.s.i., 212.5 parts of this material being initially added in about 40 seconds with amounts of zinc oxide, stearic acid, sulfur, diphenyl ethylene diamine and Santoflex AW as indicated in Table I. After the indicated temperature reaches 170° F., 40 seconds from the start, the weight 6 is lowered. The Resinex, oil and Santocure are added as in Example II at the times indicated in Table II, about 10 to 15 seconds being required for each of these additions. About 5 minutes from said start the indicated temperature reaches 230° F. (actual temperature about 255° F.) and the door 4 is opened to discharge the curable Composition D.

Samples of Composition D cured at 287° F. for different periods of time and tested like the samples of Compositions A, B and C have physical properties as indicated in Table III above.

*Example V*

Four of the uncured half treads made from Composition A of Example I and four of the uncured half treads made from control Composition C of Examples III are employed to make four tires, one of each being applied to a conventional four-ply GR-S carcass on a tire building drum, the half treads (180°) being adhered to the carcass and to themselves (at the bias cut ends) by a cent composition containing 100 parts by weight of a high Mooney GR-S polymer and 40 to 50 parts of Koresin as disclosed, for example, in British Patent No. 794,770. The four tires are expanded to toric shape and cured in the conventional manner and are then mounted on a single automobile for road tests.

These tires, identified as Tire 1, Tire 2, Tire 3 and Tire 4 in Table IV below, are then operated on the automobile at 60 miles per hour under standard load and pressure, the wear of the tread half of each tire made from Composition A being compared with the wear of the tread half of that tire made from the control Composition C at 4,560 miles, 9,120 miles, 13,680 miles and 18,240 miles. The percentage wear of the tread halves made from Composition A as compared to the control is indicated in Table IV.

The tests show that tires having treads made from rubber mixed and dried according to the one-stage method of this invention wear as well as tires having treads made from rubber mixed in the conventional manner (cooled before adding the curing agents) so as to have optimum properties.

*Example VI*

Four of the half treads made from Composition B of Example II and four of the half treads made from Composition C of Example III are employed to make four tires, which are identified as Tire 5, Tire 6, Tire 7 and Tire 8 in Table IV. The tires are made and tested in the same manner as in Example V except that the half treads are made from Composition B rather than Composition A. The results as indicated in Table IV below are very good, the wearing qualities of the tread rubber made by the method of this invention being at least as good as those of the control. The average of the results for Tires 1 through 8 indicate that rubber compositions similar to the tested Compositions A and B should be at least as good as conventional rubber compositions as far as quality is concerned.

Examination of the eight tire tread halves indicates that those made from Composition A and Composition B have much better crack resistance than those made from Composition C. Of these eight tire tread halves, only one had a slight crack whereas 7 out of 16 tread halves made from Composition C and tested in the same manner had slight cracks.

TABLE IV

| Mileage | 4,560 | 9,120 | 13,680 | 18,240 |
|---|---|---|---|---|
| | Percent | Percent | Percent | Percent |
| Tire 1 | 96 | 93 | 97 | 99 |
| Tire 2 | 104 | 103 | 101 | 102 |
| Tire 3 | 106 | 99 | 101 | 102 |
| Tire 4 | 95 | 97 | 97 | 99 |
| Tire 5 | 95 | 99 | 99 | 98 |
| Tire 6 | 102 | 98 | 102 | 101 |
| Tire 7 | 107 | 103 | 102 | 103 |
| Tire 8 | 94 | 102 | 101 | 102 |
| Average (1-8) | 100 | 99 | 100 | 101 |

Table V shows seven formulations E to K used to prepare 25 mixed rubber compositions (masterbatches) as indicated in Table VI. Such masterbatches were pelletized and baled. Table VII shows the average physical properties of a number of cured test samples formed from vulcanizable rubber compositions (E to K) employing such baled masterbatches in combination with the sulfur and the accelerators or other ingredients indicated in said Table V.

The test samples E to K may be described briefly as follows:

E—Dewatered SBR–1712, 7 parts of oil added during incorporation of the HAF carbon black.

F—Dewatered SBR–1712, no oil added.

G—Dry SBR–1712, 7 parts of oil added after HAF black was incorporated.

H—Dry SBR–1712, 3 parts of oil added after HAF black was incorporated.

I—Dry SBR–1712, 7 parts of oil added before HAF black was incorporated.

J—Dewatered SBR–1712, 10 parts of oil added during incorporation of ISAF carbon black.

K—Dewatered SBR–1808 oil-black masterbatch, compounding ingredients added at beginning of cycle.

TABLE V

| Composition | E | F | G | H | I | J | K |
|---|---|---|---|---|---|---|---|
| GR-S 1712 (Dewatered) | [1] 137.5 | [1] 137.5 | | | | [1] 137.5 | [2] 23.7 |
| GR-S 1712 (Dry) | | | 137.5 | 137.5 | 137.5 | | |
| Masterbatch 1808 [3] | | | | | | | [4] 186.1 |
| HAF Carbon Black (Vulcan 3) | 62.0 | 62.0 | 62.0 | 62.0 | 62.0 | | |
| ISAF Carbon Black (Vulcan 6) | | | | | | 72.5 | |
| Santoflex AW | 3.0 | 3.0 | 3.0 | 1.25 | 3.0 | | 3.0 |
| Oil (Philrich 5) | 4.0 | | 4.0 | 1.75 | 4.0 | 10.0 | |
| Wax | 3.0 | 3.0 | 3.0 | 3.0 | 3.0 | | 3–0 |
| Stabilite | 1.0 | 1.0 | 1.0 | 1.0 | 1.0 | 0.5 | 1–0 |
| Wingstay 100 | | | | | | 1.0 | |
| Zinc Oxide | 3.0 | 3.0 | 3.0 | 3.0 | 3.0 | 3.0 | 3.0 |
| Stearic Acid | 2.0 | 2.0 | 2.0 | 2.0 | 2.0 | 2.0 | 2.0 |
| Curatives [5] | | | | | | | |
| Nobs No. 1 | | | | | | 1.3 | |
| Diphenylguanidine | | | | | | 0.2 | |
| Santocure | 1.2 | 1.2 | 1.2 | 1.2 | 1.2 | | 1.2 |
| Sulfur | 2.0 | 2.0 | 2.0 | 2.0 | 2.0 | 2.0 | 2.0 |
| Total Parts by Weight | 218.7 | 214.7 | 218.7 | 214.7 | 218.7 | 230.0 | 225.0 |

[1] The above formulation is based on 137.5 parts (dry weight) of the SBR–1712 rubber which includes 100 parts of the butadiene-styrene copolymer.
[2] About 18.5% moisture content.
[3] The above formulation is based on the dry weight. The SBR–1808 is also dewatered.
[4] About 21.9% moisture content.
[5] The sulfur and accelerators are dispersed in the rubber composition after the dried masterbatch has been removed from the Banbury mixer and baled.

TABLE VI

| R[1] lbs. | Batch No. | Drop Temp., °F. | Batch (Dry) lbs. | Percent Vol. Mat. | Loading and Mixing Time | Ram Down Mixing Time | Carbon Black Percent | Percent Ash | Mooney Visc. ML-4 | Banbury Peak,[2] H.P. | Peak 30-sec., H.P. | Parts Liquid (oil) | Oil Add'n Temp., °F. | Vol. Mat., Percent |
|---|---|---|---|---|---|---|---|---|---|---|---|---|---|---|
| G | 1 | 355 | 250 | | 2'44" | 1'38" | | | 43 | 1,032 | 967 | 7 | 255 | |
| G | 2 | 355 | 250 | | 2'13" | 1'39" | 29.83 | 1.95 | 45 | 1,032 | 954 | 7 | 255 | |
| H | 3 | 317 | 250 | | | 1'58" | | | | | | 3 | 255 | |
| H | 4 | 350 | 250 | | 1'58" | 1'28" | | | 56 | 1,045 | 980 | 3 | 255 | |
| I | 5 | 355 | 250 | | 2'4" | 1'28" | | | 49 | 1,072 | 1,008 | [3]7 | 175 | |
| I | 6 | 353 | 250 | | 2'6" | 1'34" | 29.48 | 1.90 | 54 | 992 | 934 | [3]7 | 175 | |
| I | 7 | 365 | 250 | | 3'12" | 1'24" | | | 36 | 925 | 829 | [3]7 | 175 | |
| E | 8 | 325 | 300 | 18.8 | | 2'58" | | | | | | 7 | 220 | |
| E | 9 | 322 | 310 | 14.4 | 3'56" | 3'14" | 30.92 | 1.93 | 55 | 911 | 792 | 7 | 220 | .02 |
| E | 10 | 325 | 310 | 14.4 | 3'42" | 3'00" | | | 49 | 858 | 739 | 7 | 220 | .10 |
| E | 11 | 325 | 310 | | 3'40" | 2'58" | 30.59 | 1.85 | 50 | 831 | 765 | 7 | 220 | .06 |
| F | 12 | 325 | 305 | 20.2 | 3'50" | 3'11" | 28.21 | 1.83 | 56 | 790 | 740 | 0 | | .04 |
| F | 13 | 325 | 320 | 21.2 | 3'58" | 3'14" | 29.21 | 1.67 | 57 | 777 | 711 | 0 | | .10 |
| F | 14 | 320 | 300 | | 4'2" | 3'18" | 28.86 | 1.66 | 57 | 737 | 700 | 0 | | .15 |
| F | 15 | 285 | 300 | | | 2'20" | 30.64 | 1.84 | 60 | 777 | 725 | 0 | | .37 |
| J | 16 | 327 | 300 | 18.5 | 3'42" | 2'51" | 32.94 | 1.65 | 63 | 858 | 832 | 10 | 170 | .16 |
| J | 17 | 335 | 300 | 18.5 | 3'50" | 3'3" | 32.99 | 1.50 | 73 | 858 | 832 | 10 | 170 | .06 |
| J | 18 | 335 | 300 | 18.5 | 3'45" | 2'56" | 34.75 | 1.79 | 72 | 911 | 860 | 10 | 170 | .22 |
| J | 19 | 340 | 300 | 18.5 | | 3'2" | 33.61 | 1.92 | 71 | 898 | 840 | 10 | 170 | .06 |
| J | 20 | 335 | 300 | 18.5 | 3'48" | 3'5" | 33.23 | 1.19 | 80 | 925 | 887 | 10 | 170 | .10 |
| K | 21 | 330 | 440-54 | 21.9 | 3'57" | 3'14" | 29.62 | 1.24 | 47 | 771 | 738 | [4]3 | 225 | .00 |
| K | 22 | 327 | 440-54 | 21.9 | 3'35" | 2'52" | 30.07 | 1.14 | 45 | 791 | 752 | [4]3 | 225 | .12 |
| K | 23 | 330 | 440-54 | 21.9 | 3'35" | 2'52" | 29.92 | 1.21 | 45 | 798 | 764 | [4]3 | 225 | .20 |
| K | 24 | 325 | 440-54 | 21.9 | 3'26" | 2'50" | 29.83 | 1.29 | 44 | 777 | 752 | [4]3 | 225 | .14 |
| K | 25 | 327 | 440-54 | 21.9 | 3'26" | 2'56" | 29.88 | 1.43 | 44 | 764 | 738 | [4]3 | 225 | .14 |

[1] Rubber Composition.
[2] Batches 1 to 7, Banbury steam pressure 2 to 5 p.s.i.g. Batches 8 to 25, Banbury steam pressure is about 125 p.s.i.g.
[3] Santoflex AW and Philrich 5 added before carbon black was incorporated.
[4] The liquid is Santoflex AW. The total cycle time would be equal to the loading and mixing time plus the time for opening and closing the discharge door, which is less than 40 seconds.

TABLE VII

| | E | F | G | H | I | J | K |
|---|---|---|---|---|---|---|---|
| Mooney Viscosity (ML-4) | 45-54 | 47-51 | 44-47 | 41-43 | 42-43 | 62-67 | 43-44 |
| Micromax Discharge, Temp., °F. | 220 | 230-240 | 215-217 | 208-212 | 216-219 | 220 | 220 |
| Batch Weight, lbs. | 434.7 | 435.5 | 400 | 434.4 | 434.4 | | 434.2 |
| Mixing Cycle Time, minutes[1] | 3 | 4.0 | 3.5 | 3.0 | 3.0 | 3 | 3 |
| 300% Modulus (p.s.i.): Min. Cure, 287° F.— | | | | | | | |
| 15 | 200 | 250 | 300 | 375 | 300 | 50 | 175 |
| 30 | 950 | 800 | 750 | 1,100 | 925 | 1,250 | 625 |
| 45 | 1,200 | 925 | 900 | 1,250 | 1,100 | 1,600 | 800 |
| 60 | 1,250 | 925 | 875 | 1,250 | 1,100 | 1,675 | 875 |
| 90 | 1,250 | 1,050 | 975 | 1,300 | 1,150 | 1,700 | 850 |
| Tensile Strength (p.s.i.): Min. Cure, 287° F.— | | | | | | | |
| 15 | 700 | 1,600 | 1,550 | 1,450 | 1,350 | 50 | 1,000 |
| 30 | 2,650 | 2,850 | 2,425 | 2,450 | 2,375 | 2,950 | 2,775 |
| 45 | 2,775 | 2,925 | 2,375 | 2,475 | 2,475 | 3,050 | 2,875 |
| 60 | 2,650 | 2,925 | 2,475 | 2,500 | 2,375 | 2,975 | 3,000 |
| 90 | 2,700 | 2,800 | 2,550 | 2,450 | 2,325 | 2,900 | 2,925 |
| Percent Elongation: Min. Cure, 287° F.— | | | | | | | |
| 15 | 740 | 990 | 870 | 870 | 930 | 880 | 1,020 |
| 30 | 660 | 730 | 690 | 560 | 610 | 590 | 850 |
| 45 | 590 | 670 | 620 | 550 | 590 | 520 | 740 |
| 60 | 550 | 650 | 600 | 540 | 540 | 490 | 730 |
| 90 | 540 | 630 | 600 | 510 | 520 | 470 | 720 |
| Durometer Hardness (Shore A): Min. Cure, 287° F.— | | | | | | | |
| 15 | 46 | 46 | 47 | 50 | 48 | 45 | 43 |
| 30 | 55 | 53 | 53 | 57 | 56 | 60 | 50 |
| 45 | 58 | 55 | 55 | 55 | 58 | 62 | 53 |
| 60 | 59 | 55 | 55 | 59 | 57 | 64 | 53 |
| 90 | 60 | 55 | 55 | 55 | 59 | 58 | 54 |
| Tear Strength, lbs.: Min. Cure, 287° F.— | | | | | | | |
| 15 | 302 | 374 | 370 | 295 | 296 | 24.6 | 262 |
| 30 | 425 | 480 | 372 | 351 | 350 | 500 | 405 |
| 45 | 358 | 358 | 352 | 369 | 348 | 480 | 435 |
| 60 | 332 | 356 | 350 | 415 | 356 | 374 | 348 |
| 90 | 430 | 370 | 376 | 342 | 362 | 430 | 338 |
| Percent Rebound (60 Min. Cure, 287° F) | 52.0 | 54.4 | 53.0 | 52.5 | 53.0 | 48.2 | 52.5 |

[1] The sulfur, accelerator and any other remaining ingredient, such as Santoflex AW, are dispersed using a conventional 11 Banbury mixer, 30 r.p.m. and 110 p.s.i.

*Example VII*

Each of the compositions E to K of Table V is prepared by substantially the same method. The composition E, for example, is prepared by adding 136.5 parts (dry weight) of dewatered SBR-1712 masterbatch with a moisture content of 14 to 19% to a high speed high pressure Banbury mixer of the general type shown in the drawings together with 62.0 parts of dry HAF carbon black, masticating the mixture to raise the temperature above 200° F., thereafter adding the 7 parts of oil (Philrich 5 and Santoflex AW) by pumping it through the oil injection hose of the Banbury mixer while the temperature indicated by the micromax pyrometer is in the neighborhood of 220° F., and thereafter adding all the other compounding ingredients except the curing agents (sulfur and accelerator) and continuing the mastication until the temperature indicated by the pyrometer is in the neighborhood of 325° F. The rubber mixture, which is sometimes called a "non-productive" masterbatch, is then discharged from the mixer. The total time for this first mixing cycle is less than 5 minutes. The Mooney viscosity of this rubber mixture is in the neighborhood of 55 as indicated in Table VI. This quick mixing and drying is accomplished by employing a rotor speed of 80 revolutions per minute and a pressure of about 100 to 110 pounds per square inch on a 20" diameter ram. In batch #9, for example, the rubber mixture contains .02 percent volatile matter after discharge from the Banbury.

The rubber mixture is then baled for shipment to the rubber tire factory. At the factory it is loaded into a conventional No. 11 Banbury mixer operated at a rotor speed of 30 r.p.m. and a pressure of about 110 p.s.i. on an 11 inch ram, and the Santocure (accelerator) and sulfur are then added to said mixer and dispersed in the rubber to form the tire tread composition. The mastication in Batch No. 9, for example, raises the temperature of the rubber to about 240 to 245° F. which is below the vulcanization temperature. The time for this second mixing cycle is about 3 minutes. The final Mooney viscosity of the resulting tire tread composition (Batch No. 9) is about 45 to 54 as indicated in Table VII.

The procedure for preparing compositions F to K is about the same except as indicated in Table VI. Thus the 7 parts of oil (Philrich 5 and Santoflex AW) of composition I are added during mastication of the wet crumb after the temperature indicated by the micromax pyrometer is about 175° F. and just before the carbon black is added.

In each of the 25 runs the final vulcanizable rubber composition is extruded and test samples are cured at 287° F. for different periods of time and the physical properties of such samples are measured in the conventional manner and recorded as in Table VII.

The first two batches (composition G), using entirely dry materials, are mixed by adding process oil and liquid Santoflex AW after the black has been incorporated. The next two batches (composition H) are mixed by adding Santoflex AW only after the black has been incorporated. The last three batches of dry mix are prepared by adding process oil at the same time that the dry black is being incorporated to serve as a control and confirm that addition of oil to the dry black would result in poor dispersion. Sharp razor cuts for observation of dispersion shows that batches 1 through 4 are good whereas batches 5, 6 and 7 are poor.

The next four batches (composition E) demonstrate that an organic liquid may be added to the batch before the dry HAF black is completely incorporated without affecting black dispersion. The process oil and Santoflex AW are started halfway through the mix while there still is free dry black. Sharp razor cuts of the cured samples made of composition E show that the black dispersion is excellent, and equivalent to that of the samples made of composition F.

The masterbatch produced during the first mixing cycle is discharged in a well massed condition and is entirely satisfactory for further processing when produced by this method.

The four batches made of composition F are mixed with no oil or other organic liquid being added during dispersion of the black the purpose being to provide the ultimate in black dispersion for comparison purposes.

The next five batches (composition J) show the high quality of dispersion obtained when mixing ISAF carbon black with dewatered SBR-1712 rubber. Ten parts of process oil are added to the batch over the entire mixing period, and excellent dispersion of the carbon black is obtained. The oil is started into the Banbury mixer the moment the ram reaches the down position.

The last five batches (composition K) show the effect of adding compounding ingredients to a dewatered black masterbatch during the drying operation. No difficulties are encountered, and there is no appreciable increase in cycle time. It is advantageous to add the wax and other ingredients (other than curatives) while the masterbatch is at high temperature and their incorporation is faster.

In the 25 batches described above, dry carbon black is used to minimize the drying time, but wet carbon black can also be used following essentially the same procedure.

TABLE VIII

| Batch No. | 1 | 2 | 3 | 4 | 5 | 6 | 7 | 8 | 9 | 10 | 11 | 12 | 13 |
|---|---|---|---|---|---|---|---|---|---|---|---|---|---|
| Composition | M | M | S | S | S | L | L | L | L | Q | Q | Q | Q |
| Oven-Dried SBR-1712 | | | | | | 137.5 | 137.5 | 137.5 | 137.5 | 137.5 | 137.5 | 137.5 | 137.5 |
| Dewatered SBR-1712* (dry parts) | 137.5 | 137.5 | 137.5 | 137.5 | 137.5 | | | | | | | | |
| HAF Carbon Black | 62.4 | 62.4 | 64.6 | 63.0 | 68.0 | 68.0 | 68.0 | 68.0 | 68.0 | 68.0 | 68.0 | 69.0 | 69.0 |
| Santoflex AW | 2.7 | 2.7 | 1.2 | 1.2 | 1.3 | 3.0 | 3.0 | 3.0 | 3.0 | 1.3 | 1.3 | 1.2 | 1.2 |
| Philrich 5 | 3.6 | 3.6 | 1.6 | 1.6 | 1.7 | 4.0 | 4.0 | 4.0 | 4.0 | 1.7 | 1.7 | 2.8 | 2.8 |
| Zinc Oxide | 2.7 | 2.7 | 2.8 | 2.7 | 2.9 | 3.0 | 3.0 | 3.0 | 3.0 | 3.0 | 3.0 | 2.7 | 2.7 |
| Stearic Acid | 1.8 | 1.8 | 1.9 | 1.8 | 2.0 | 2.0 | 2.0 | 2.0 | 2.0 | 2.0 | 2.0 | 1.8 | 1.8 |
| Wingstay 100 | .9 | .9 | .9 | .9 | 1.0 | 1.0 | 1.0 | 1.0 | 1.0 | 1.0 | 1.0 | .9 | .9 |
| Wax | 2.7 | 2.7 | 2.8 | 2.7 | 2.9 | 3.0 | 3.0 | 3.0 | 3.0 | 3.0 | 3.0 | 2.7 | 2.7 |
| Oil Addition Temperature | 240 | 280 | 280 | 270 | 280 | 280 | 310 | 300 | 310 | 270 | 310 | 310 | 310 |
| Percent Moisture in Crumb | 17.5 | 17.5 | 14.2 | 14.2 | 14.2 | | | | | | | | |
| Lbs. of Wet Polymer charged | 318 | 310 | 310 | 318 | 295 | | | | | | | | |
| Calculated Dry Batch Weight | 414.2 | 407.4 | 419.8 | 412.6 | 399.6 | 400 | 400 | 400 | [1] 420 | 400 | [2] 450 | [3] 445 | [3] 445 |
| Ram Down Mix Time (minutes) | 3.35 | 3.12 | 2.87 | 2.14 | 2.45 | 1.58 | 1.75 | 1.75 | 1.67 | 1.5 | 1.45 | 1.37 | |
| Micromax discharge temp., °F | 335 | 345 | 345 | 300 | 335 | 355 | 370 | 360 | 365 | 465 | 365 | 370 | 370 |
| Peak Horsepower | 1,427 | 1,295 | 1,257 | 1,295 | 1,312 | 1,200 | 1,240 | 1,461 | 1,219 | 1,630 | 1,593 | 1,725 | |
| Power Consumed (Kilowatt Hrs.) | 35.0 | 32.8 | 33.1 | 26.7 | 27.7 | 20 | 20.5 | 19.6 | 22.0 | 20.0 | 21.2 | 21.8 | 23.6 |
| Mooney Viscosity (ML-4) | 48.5 | 46 | 45 | 55 | 54 | 61 | 56 | 50 | 55 | | 51 | 67 | 59 |
| Percent Carbon Black | 26.8 | 26.97 | 26.65 | 27.84 | 28.46 | | | | | | | | |
| Percent Volatile Matter (bale) | .35 | .15 | .19 | .16 | .03 | | | | | | | | |

*Oven dried SBR-1712 taken from coagulation line at the same time as the dewatered SBR-1712.
[1] 20 lbs. of composition L (Batch 8) added as overweight.
[2] 50 lbs. of composition Q (Batch 10) added as overweight.
[3] 45 lbs. of oven-dried SBR-1808 added as overweight to increase volume in Banbury mixer.

TABLE IX

| Batch No. | 14 | 15 | 16 | 17 | 18 | 19 | 20 | 21 | 22 | 23 | 24 | 25 | 26 |
|---|---|---|---|---|---|---|---|---|---|---|---|---|---|
| Composition | N | N | O | O | O | W | W | W | U | U | U | U | U |
| Oven dried SBR-1712 | | | | | | | | | 137.5 | 137.5 | 137.5 | 137.5 | 137.5 |
| Dewatered SBR-1712* (dry parts) | 137.5 | 137.5 | 137.5 | 137.5 | 137.5 | 137.5 | 137.5 | 137.5 | | | | | |
| ISAF Carbon Black | 65.6 | 65.6 | 64.7 | 64.7 | 64.7 | 65.2 | 65.2 | 65.2 | 67.2 | 67.2 | 67.2 | 67.2 | 67.2 |
| Santoflex AW | 2.9 | 2.9 | 1.2 | 1.2 | 1.2 | 1.1 | 1.1 | 1.1 | 1.2 | 1.2 | 1.2 | 1.2 | 1.2 |
| Philrich 5 | 3.8 | 3.8 | 1.6 | 1.6 | 1.6 | 1.5 | 1.5 | 1.5 | 1.6 | 1.6 | 1.6 | 1.6 | 1.6 |
| Zinc Oxide | 2.9 | 2.9 | 2.8 | 2.8 | 2.8 | 2.5 | 2.5 | 2.5 | 2.7 | 2.7 | 2.7 | 2.7 | 2.7 |
| Stearic Acid | 1.9 | 1.9 | 1.9 | 1.9 | 1.9 | 1.7 | 1.7 | 1.7 | 1.8 | 1.8 | 1.8 | 1.8 | 1.8 |
| Wingstay 100 | 1.0 | 1.0 | .9 | .9 | .9 | .85 | .85 | .85 | .9 | .9 | .9 | .9 | .9 |
| Wax | 2.9 | 2.9 | 2.8 | 2.8 | 2.8 | 2.5 | 2.5 | 2.5 | 2.7 | 2.7 | 2.7 | 2.7 | 2.7 |
| Oil Addition Temperature | 240 | 280 | 280 | 280 | 280 | 280 | 280 | 295 | 280 | 280 | 280 | 280 | 280 |
| Percent Moisture in Crumb | 14.2 | 14.2 | 14.1 | 14.1 | 14.1 | 11.25 | 12.5 | 12.5 | | | | | |
| Lbs. of Wet Polymer Charged | 300 | 300 | 310 | 310 | 310 | 300 | 300 | 300 | | | | | |
| Calculated Dry Batch Weight | 409 | 409 | 412 | 412 | 412 | ¹457 | ¹457 | ¹457 | ¹438 | ¹438 | ¹438 | ¹438 | ¹437 |
| Ram Down Mix Time (minutes) | 2.29 | 2.56 | 2.43 | 2.20 | 2.38 | 2.43 | 2.53 | ²3.69 | | 1.63 | 1.55 | 1.50 | 1.64 |
| Micromax Discharge Temp., °F | 330 | 345 | 350 | 345 | 345 | 350 | 350 | 330 | | 370 | 350 | | 360 |
| Peak Horsepower | 1,239 | 1,200 | 1,257 | 1,408 | 1,389 | 1,575 | 1,445 | 1,445 | | 1,461 | 1,388 | 1,538 | 1,500 |
| Power Consumed (Kilowatt Hrs.) | 28.4 | 29.1 | 29.6 | 31.5 | 27.9 | 36.4 | 34.0 | 30.8 | | 23.6 | 22.0 | 21.5 | 23.5 |
| Mooney Viscosity (ML-4) | 60 | 54 | 55 | 71 | 61 | 64 | 65 | 69 | 73 | 66 | 61 | 72 | 76 |
| Percent Carbon Black | 29.8 | 29.27 | 29.40 | 32.34 | 29.56 | | | | | | | | |
| Percent Volatile Matter (bale) | .17 | .19 | .15 | .14 | .09 | .14 | .12 | .19 | | .22 | .20 | | .23 |

*Oven dried SBR-1712 taken from coagulation line at the same time as the dewatered SBR-1712.
¹ 45 lbs. SBR-1813 added as overweight to increase volume in Banbury.
² Rubber sealed around ram. The temperature and cycle time are not indicative of this type of mix.

TABLE X

| Composition | P | P | T | T | R | R | V | V | Q | Q | U | U | W | W | S | S |
|---|---|---|---|---|---|---|---|---|---|---|---|---|---|---|---|---|
| First Cycle (Time, Min.) | *6.5 | *6.5 | *6.5 | *6.5 | *6.5 | *6.5 | *6.5 | *6.5 | Table VIII | Table VIII | Table IX | Table IX | Table IX | Table IX | Table VIII | Table VIII |
| Oil Addition Temp., °F | 320 | 320 | 320 | 320 | 320 | 320 | 320 | 320 | Table VIII | Table VIII | Table IX | Table IX | Table IX | Table IX | Table VIII | Table VIII |
| Dump Temp., °F. (Micromax) | 340 | 340 | 340 | 340 | 340 | 340 | 340 | 340 | Table VIII | Table VIII | Table IX | Table IX | Table IX | Table IX | Table VIII | Table VIII |
| Mooney Visc. ML-4 | 80–68 | | 126–106 | | 95–81 | | 108–88 | | | | | | | | | |
| Masterbatch (parts) | 219.7 | 219.7 | 219.0 | 219.0 | 216.0 | 216.0 | 216.0 | 216.0 | 218.4 | 218.4 | 215.4 | 215.4 | 212.9 | 212.9 | 215.0 | 215.0 |
| Santoflex AW | | | | | | | | | 2.0 | 2.0 | 2.0 | 2.0 | 2.0 | 2.0 | 2.0 | 2.0 |
| Santocure | 1.2 | 1.2 | 1.2 | 1.2 | 1.2 | 1.2 | 1.2 | 1.2 | 1.2 | 1.2 | 1.2 | 1.2 | 1.2 | 1.3 | 1.2 | 1.2 |
| Sulfur | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Second Cycle (Time, Min.) | 3 | 3 | 3 | 3 | 3 | 3 | 3 | 3 | 3.5 | 3.5 | 3.5 | 3.5 | 3.5 | 3.5 | 3.5 | 3.5 |
| Dump Temp., °F. (Micromax) | 220 | 220 | 220 | 220 | 220 | 220 | 220 | 220 | 220 | 220 | 220 | 220 | 220 | 220 | 220 | 220 |
| Mooney Visc. (ML-4 slab) | 61–55 | | 79–71 | | 64–57 | | 70–63 | | 57–50.5 | | 62–54 | | 65–58 | | 56–49 | |
| Rapid Modulus | 24 | 27 | 27 | 27 | 25 | 26 | 22 | 27 | 22 | 25 | 20 | 21 | 17 | 19 | 18 | 20 |
| Specific Gravity | 1.14 | 1.14 | 1.14 | 1.14 | 1.14 | 1.14 | 1.14 | 1.14 | 1.14 | 1.14 | 1.13 | 1.13 | 1.12 | 1.12 | 1.12 | 1.12 |

*Conventional mixing in No. 11 Banbury at 40 r.p.m. Batch weight 440 pounds.

TABLE XI

| Composition | L | M | N | O | P | Q | R | S | T | U | V | W |
|---|---|---|---|---|---|---|---|---|---|---|---|---|
| Oven Dried SBR-1712 (parts) | 137.5 | | | | 137.5 | 137.5 | 137.5 | | 137.5 | 137.5 | 137.5 | |
| Dewatered SBR-1712* | | 137.5 | 137.5 | 137.5 | | | | 137.5 | | | | 137.5 |
| HAF Carbon Black | 68.0 | 62.4 | | | 68.0 | 68.5 | 65.0 | 65.2 | | | | |
| ISAF Carbon Black | | | 65.6 | 64.7 | | | | | 68.0 | 67.2 | 65.0 | 65.2 |
| Santoflex AW | 3.0 | 2.7 | 2.9 | 1.2 | 3.0 | 3.25 | 3.0 | 3.2 | 3.0 | 3.2 | 3.0 | 3.1 |
| Philrich 5 | 4.0 | 3.6 | 3.8 | 1.6 | 2.25 | 2.25 | 1.5 | 1.6 | 1.5 | 1.6 | 1.5 | 1.5 |
| Zinc Oxide | 3.0 | 2.7 | 2.9 | 2.8 | 3.0 | 2.85 | 3.0 | 2.8 | 3.0 | 2.7 | 3.0 | 2.5 |
| Stearic Acid | 2.0 | 1.8 | 1.9 | 1.9 | 2.0 | 1.9 | 2.0 | 1.9 | 2.0 | 1.8 | 2.0 | 1.7 |
| Wingstay 100 | 1.0 | .9 | 1.0 | .9 | 1.0 | .95 | 1.0 | 1.0 | 1.0 | .9 | 1.0 | .85 |
| Wax | 3.0 | 2.7 | 2.9 | 2.8 | 3.0 | 2.85 | 3.0 | 2.8 | 3.0 | 2.7 | 3.0 | 2.5 |
| Santocure | 1.2 | 1.2 | 1.2 | 1.2 | 1.2 | 1.2 | 1.2 | 1.2 | 1.2 | 1.2 | 1.2 | 1.2 |
| Sulfur | 2.0 | 2.0 | 2.0 | 2.0 | 2.0 | 2.0 | 2.0 | 2.0 | 2.0 | 2.0 | 2.0 | 2.0 |
| Total Parts by Weight | 224.7 | 217.5 | 221.7 | 216.6 | 222.95 | 223.25 | 218.2 | 219.2 | 222.2 | 220.8 | 219.2 | 218.05 |
| | | | | | Min. Cure at 287° F. | | | | | | | |
| 300% Modulus (p.s.i.) | 1,075 / 1,275 / 1,450 | 625 / 725 / 750 | 800 / 900 / 950 | 750 / 1,000 / 1,100 | 30 / 45 / 60 | | | | | | | |
| Tensile Strength (p.s.i.) | 2,950 / 3,125 / 2,900 | 2,850 / 2,875 / 2,650 | 2,925 / 2,950 / 2,975 | 3,125 / 3,125 / 3,300 | 30 / 45 / 60 | | | | | | | |
| Elongation, percent | 680 / 610 / 560 | 740 / 690 / 640 | 690 / 630 / 620 | 720 / 650 / 630 | 30 / 45 / 60 | | | | | | | |
| Durometer Hardness (Shore A) | 56 / 58 / 58 | 50 / 51 / 52 | 54 / 56 / 56 | 55 / 56 / 57 | 30 / 45 / 60 | | | | | | | |

*Oven dried SBR-1712 taken from coagulation line at the same time as the dewatered SBR-1712.

TABLE XII

| Composition | P | | Q | | R | | S | | T | | U | | V | | W | |
|---|---|---|---|---|---|---|---|---|---|---|---|---|---|---|---|---|
| Parts by Weight | 222.95 | | 223.25 | | 218.2 | | 219.2 | | 222.2 | | 220.8 | | 219.2 | | 218.05 | |
| Type Drying | Oven Dried | | Oven Dried | | Oven Dried | | Banbury Dried | | Oven Dried | | Oven Dried | | Oven Dried | | Banbury Dried | |
| | Slab | Ext. | Slab | Ext. | Slab | Ext. | Slab | Ext. | Slab | Ext. | Slab | Ext. | Slab | Ext. | Slab | Ext. |
| 300% Modulus (p.s.i.): Min. Cure, 287° F.— | | | | | | | | | | | | | | | | |
| 15 | 475 | 200 | 300 | 400 | 475 | 400 | 225 | 225 | 425 | 425 | 175 | 250 | 300 | 325 | 225 | 225 |
| 30 | 1,225 | 1,075 | 1,075 | 950 | 1,150 | 1,150 | 675 | 650 | 1,200 | 1,125 | 850 | 800 | 925 | 950 | 850 | 750 |
| 45 | 1,450 | 1,325 | 1,275 | 1,150 | 1,400 | 1,275 | 850 | 850 | 1,325 | 1,375 | 1,100 | 1,000 | 1,225 | 1,175 | 1,025 | 975 |
| 60 | 1,500 | 1,400 | 1,325 | 1,250 | 1,450 | 1,425 | 950 | 925 | 1,450 | 1,475 | 1,100 | 1,100 | 1,350 | 1,300 | 1,150 | 1,050 |
| 90 | 1,450 | 1,425 | 1,325 | 1,300 | 1,400 | 1,400 | 925 | 1,000 | 1,500 | 1,475 | 1,125 | 1,200 | 1,475 | 1,325 | 1,150 | 1,075 |
| Tensile Strength (p.s.i.): Min. Cure, 287° F.— | | | | | | | | | | | | | | | | |
| 15 | 1,975 | 1,050 | 1,075 | 1,700 | 2,150 | 2,025 | 1,300 | 1,700 | 1,950 | 2,075 | 1,100 | 1,450 | 1,600 | 2,025 | 1,200 | 1,675 |
| 30 | 3,050 | 2,850 | 2,675 | 2,750 | 3,175 | 3,025 | 2,850 | 2,950 | 3,325 | 3,225 | 2,850 | 3,025 | 3,250 | 2,975 | 3,375 | 3,050 |
| 45 | 3,050 | 2,850 | 2,950 | 2,875 | 3,150 | 3,000 | 2,950 | 3,050 | 3,325 | 3,300 | 3,150 | 3,175 | 3,450 | 3,100 | 3,475 | 3,175 |
| 60 | 2,950 | 2,900 | 2,750 | 3,000 | 3,100 | 3,025 | 2,724 | 2,975 | 3,275 | 3,300 | 3,025 | 3,125 | 3,325 | 3,075 | 3,575 | 3,400 |
| 90 | 2,825 | 2,925 | 2,700 | 2,800 | 3,125 | 3,000 | 2,900 | 3,025 | 3,425 | 3,175 | 3,050 | 3,200 | 3,325 | 3,075 | 3,500 | 3,500 |
| Elongation, Percent: Min. Cure, 287° F.— | | | | | | | | | | | | | | | | |
| 15 | 830 | 920 | 1,000 | 860 | 830 | 890 | 1,090 | 980 | 830 | 870 | 950 | 950 | 910 | 900 | 1,030 | 1,000 |
| 30 | 620 | 640 | 620 | 700 | 650 | 640 | 740 | 760 | 620 | 660 | 670 | 710 | 660 | 650 | 740 | 750 |
| 45 | 560 | 570 | 600 | 640 | 550 | 600 | 670 | 700 | 570 | 590 | 620 | 650 | 600 | 610 | 670 | 680 |
| 60 | 520 | 540 | 560 | 620 | 540 | 570 | 650 | 650 | 540 | 560 | 610 | 630 | 570 | 550 | 640 | 670 |
| 90 | 510 | 530 | 540 | 600 | 540 | 560 | 620 | 620 | 530 | 540 | 600 | 620 | 530 | 550 | 630 | 650 |
| Durometer Hardness (Shore A): Min. Cure, 287° F.— | | | | | | | | | | | | | | | | |
| 15 | 50 | 54 | 37 | 48 | 51 | 51 | 44 | 45 | 54 | 53 | 51 | 49 | 51 | 51 | 47 | 50 |
| 30 | 56 | 60 | 55 | 55 | 58 | 57 | 50 | 51 | 60 | 58 | 57 | 57 | 58 | 57 | 54 | 55 |
| 45 | 58 | 60 | 58 | 57 | 59 | 58 | 54 | 54 | 60 | 60 | 58 | 57 | 60 | 58 | 57 | 58 |
| 60 | 59 | 61 | 59 | 58 | 59 | 58 | 54 | 54 | 61 | 61 | 59 | 58 | 60 | 59 | 58 | 58 |
| 90 | 60 | 61 | 59 | 58 | 60 | 59 | 55 | 55 | 61 | 62 | 60 | 59 | 60 | 59 | 59 | 59 |
| Tear Strength, Lbs.: Min. Cure, 287° F.— | | | | | | | | | | | | | | | | |
| 15 | 393 | 404 | 222 | 327 | 417 | 396 | 240 | 314 | 404 | 425 | 264 | 342 | 314 | 376 | 235 | 324 |
| 30 | 430 | 438 | 368 | 394 | 425 | 368 | 337 | 460 | 438 | 415 | 415 | 460 | 437 | 338 | 394 | 382 |
| 45 | 384 | 403 | 398 | 376 | 350 | 352 | 296 | 388 | 403 | 415 | 440 | 485 | 360 | 306 | 350 | 390 |
| 60 | 376 | 376 | 396 | 357 | 331 | 495 | 308 | 342 | 376 | 475 | 438 | 398 | 370 | 392 | 352 | 397 |
| 90 | 330 | 366 | 325 | 350 | 301 | 440 | 319 | 366 | 394 | 394 | 365 | 366 | 374 | 310 | 331 | 380 |
| Rebound, Percent | 52.0 | 53.9 | 53.9 | 55.4 | 52.0 | 52.5 | 56.4 | 55.9 | 47.8 | 48.7 | 51.5 | 51.5 | 47.3 | 51.0 | 49.6 | 50.1 |
| Type Mix | C | C | H | H | C | C | H | H | C | C | H | H | C | C | H | H |

*Example VIII*

Twenty-six batches were prepared from compositions L to W using the compositions and procedures indicated at Tables VIII to XI.

Thus, for example, batch 1 is prepared by adding 137.5 parts (dry weight) of dewatered SBR-1712 (wet crumb) having a moisture content of 17.5% and 62.4 parts by weight of HAF carbon black to a No. 11 Banbury mixer having a constant speed of 80 r.p.m. and a pressure of about 100 pounds per square inch on a 20-inch cylinder. The material was then masticated in the mixer under said pressure of 100 pounds per square inch to raise the temperature of the rubber above 230° F. The oil (Philrich 5 and Santoflex AW) was pumped through the oil injection hose of the mixer into the mixing chamber when the temperature was 240° F. to 280° F. During the mastication in this first mixing cycle, all of the compounding ingredients except the curatives were added unless otherwise indicated in the tables (i.e., compositions Q, W, W and S, Table X). At the time of discharge from the Banbury mixer at the end of the first mixing cycle, the temperature indicated by the micromax pyrometer is 335° F. to 345° F. The Mooney viscosity of the resulting oil-black masterbatch is about 46 to 49 and the percent of volatile matter after the masterbatch is pelletized and baled is no more than 0.35%.

The procedure followed with the oven dried rubber (i.e., compositions L, Q, U) is substantially the same. The composition Q, for example, is prepared by masticating the dry SBR-1712 rubber and the dry carbon black until the temperature is 270° F. to 310° F. and the carbon black is thoroughly dispersed in the rubber and thereafter adding the oil (Santoflex AW and Philrich 5). The other compounding ingredients except the curatives are then added during the mastication and masterbatch is discharged from the Banbury mixer when the temperature indicated by the micromax pyrometer is 365 to 370° F. The Mooney viscosity of the resulting oil-black masterbatch Q is about 51 to 67.

In each case the masterbatch is pelletized and baled and stored for subsequent mixture with curatives.

Table X shows the results of the second mixing cycle wherein the masterbatches made from the compositions P to W inclusive are mixed with sulfur and accelerator and in some instances, antioxidant to produce tire tread compositions for testing. As indicated in Table X, 219.7 parts by weight of the masterbatch made from composition P, for example, are mixed with 1.2 parts of Santocure and 2.0 parts of sulfur in a Banbury mixer. The time of the second mixing cycle is 3 minutes and the temperature indicated by the micromax pyrometer at the time of discharge from the mixer is 220° F. (actual temperature of the rubber is about 240 to 245° F.). The finished vulcanizable tire tread compositions P to W are later used to build tires as pointed out in Example IX.

The masterbatches P, R, T and V of Table X are mixed in the conventional manner in a No. 11 Banbury mixer at a rotor speed of 40 r.p.m. and a pressure of about 110 p.s.i. on an 11-inch cylinder. The masterbatches Q, S, U and W, of Table X are prepared by the procedures of Tables VIII and IX using a high speed high pressure Banbury mixer operated at a speed of 80 r.p.m. and a pressure of about 100 p.s.i. on a 20-inch cylinder. In Table XII, for example, the letter "C" designates such conventional mixing procedure at 40 r.p.m. and the letter "H" represents the high speed mixing at 80 r.p.m.

After the discharge of the finished rubber tire compositions L to W from the Banbury mixer at the end of the second mixing cycle, conventional test samples are cured for different periods of time to permit determination of the physical properties of the rubber. These properties are recorded in Tables XI and XII. Thus, the sample of tire tread composition L when cured for 60 minutes at 287° F. has a tensile strength of 2900 p.s.i. Each of the compositions L to O of Table XI are prepared by adding the oil after the carbon black has been incorporated in the rubber.

The test samples of the tire tread compositions P to W were prepared in two different ways. One sample was a cured slab and the other was an extrusion.

*Example IX*

Finished tire tread compositions P to W, inclusive, prepared by the procedure of Example VIII were used to form uncured half treads generally as in Example V. Sixteen of these half treads were employed to build 8 tires A–1, A–2, B–1, B–2, C–1, C–2, D–1 and D–2 as indicated in Table XIII, the tires being vulcanized in the conventional manner. The tires of Test Group I were mounted on one test car, and the tires of Test Group II were mounted on another test car. Each tire was a 7:50 x 14 tubeless tire having a 2-ply SBR rubber carcass and two half (180°) treads and was inflated to a pressure of 30 pounds per square inch gage. Each of the tires to be tested was mounted on a Chevrolet automobile having a weight in the neighborhood of 2300 pounds, and each test car was driven at a high speed in the neighborhood of 75 miles per hour by test drivers working two or three 8-hour shifts, the tires being rotated (switched) four times in 4500 miles using the usual forward-X pattern. The ambient temperatures during the tests were about 70° F. to 96° F.

Each tire had half of the tread made from a control composition so as to provide a proper basis for comparison even if the 2-ply tires performed poorly. The SBR rubber polymer and reinforcing carbon black used in the control compositions were from the same lot as their high-speed Banbury-dried counterparts.

The results of the test are indicated in Table XIII. Thus, each of the tires A–1 and A–2 had half of its tread formed of the control composition P and the other half formed of the composition Q. The tread wear of the composition Q appeared to be about the same as that of the control composition P.

TABLE XIII.—TEST GROUP I

| Tire | Tread Construction | Miles Run | Miles/Mil | Wear Rating |
|---|---|---|---|---|
| A–1 | ½P<br>½Q | 13,100 | 50.1<br>48.3 | 100<br>96 |
| B–1 | ½R<br>½S | 7,313 | 52.9<br>61.4 | 100<br>116 |

TEST GROUP II

| Tire | Tread Construction | Miles Run | Miles/Mil | Wear Rating |
|---|---|---|---|---|
| A–2 | ½P<br>½Q | 10,125 | 41.7<br>43.7 | 100<br>104 |
| B–2 | ½R<br>½S | 10,125 | 44.3<br>52.3 | 100<br>118 |
| C–1 | ½T<br>½U | 5,795 | 69.2<br>65.6 | 100<br>95 |
| C–2 | ½T<br>½U | 11,250 | 50.4<br>52.6 | 100<br>104 |
| D–1 | ½V<br>½W | 11,250 | 53.6<br>56.6 | 100<br>106 |
| D–2 | ½V<br>½W | 11,250 | 51.2<br>56.6 | 100<br>111 |

Comparing the results of each experimental tread stock against its conventionally dry-mixed control, the average ratings are as follows:

Wear rating
Control (P, T, R or V) _____ 100
S—Hi-Speed, Hi-Pressure-Mixed, Dewatered, SBR–1712/HAF _____ 117
W—Hi-Speed, Hi-Pressure-Mixed, Dewatered, SBR–1712/ISAF _____ 109
Q—Hi-Speed, Hi-Pressure-Mixed, Oven-Dried, SBR–1712/HAF _____ 100
U—Hi-Speed, Hi-Pressure-Mixed, Oven Dried, SBR–1712/ISAF _____ 100

A relationship between the various stocks evaluated can be calculated from Test Group II since this was a 6-tire test, all stocks being run under the same conditions over the same period of time. Using the conventionally mixed oven-dried SBR–1712/HAF controls (P and R) as a standard, the relative ratings between stocks are as follows (ignoring tire C–1):

Wear rating
Control (P and R) _____ 100
Q—Hi-Speed, Hi-Pressure Mixed, Oven Dried SBR–1712/HAF _____ 102
S—Hi-Speed, Hi-Pressure Mixed, Dewatered SBR–1712/HAF _____ 122
U—Hi-Speed, Hi-Pressure Mixed, Oven Dried SBR–1712/ISAF _____ 122
W—Hi-Speed, Hi-Pressure Mixed, Dewatered SBR–1712/ISAF _____ 132
T—Conventionally Mixed, Oven Dried, SBR–1712/ISAF [1] _____ 117
V—Conventionally Mixed, Oven-dried, SBR–1712/ISAF [1] _____ 122

[1] (The oven-dried SBR–1712 was taken from the same production lot as used in mixing the dewatered SBR–1712 experimental stocks).

In the above examples the carbon black employed may be "Philblack O," "Vulcan 3," "Aromex" or any other HAF, SAF or ISAF carbon black having an average particle diameter of about 10 to 50 microns and a surface area of 60 to 180 square meters per gram. Such carbon black may be used in the form of small pellets as is well known in the art. A major portion of the carbon black employed in the tire tread composition of this invention is preferably HAF or ISAF carbon black since it is more difficult to obtain the best dispersion when large amounts of SAF carbon black are employed.

The tread rubber compounds described herein are used for purposes of illustration only, it being obvious to those skilled in the art that the amounts and types of compounding ingredients may be varied considerably. Thus, oils such as Sundex 53 or other oils described in British Patent No. 737,086 may be used in place of Philrich 5, and various plasticizers may be used in place of Resinex. It is preferred to employ zinc oxide and stearic acid, but it will be apparent that other materials may be substituted. Reinforcing carbon blacks should be employed, but it will be apparent that small amounts of other reinforcing fillers could be employed in addition to the carbon black. The type of antioxidant or ozone protector may be varied. Thus, Agerite Stalite and other Agerite antioxidants, Wingstay 100 or other antioxidants may be used in the rubber compositions made by the method of this invention. The curing agent is preferably sulfur but other materials can be used alone or in combination with sulfur as is well known in the art.

It will be understood that accelerators other than Santocure may be used in the GR–S tread compositions made by the method of this invention. The accelerators may be Altax, Amax, Amax No. 1 or other thiazole accelerators; Ethyl Tuads, M–B–T–S or other thiuram accelerators, Tellurac, Methyl Selenac or other dithiocarbamate accelerators, or various other conventional accelerators such as DOTG or the like. The amounts of accelerator and sulfur will be proportioned generally according to established compounding practice.

Wherever the term "parts" is employed in the specification or claims, parts by weight is meant, unless the context shows otherwise. Also, the term parts, whenever applied to any compounding ingredients other than the rubber polymer, refers to parts p.h.r. (per 100 parts of rubber polymer) unless otherwise indicated. Whenever percentages are used to describe the proportions of ingredients, percentage by weight is meant.

The term "rubbery material" is used herein in the generic sense and includes polymer plus oil as well as polymer alone.

The term "vulcanizable" is used herein to describe rubber compositions containing curing agents, such as sulfur and an accelerator, which compositions can be cured to the elastic state by heating.

The term "wet crumb" is used herein to describe the rubber material obtained after coagulation at the polymer plant and containing a substantial amount of water which has not been separated from the coagulum. At the polymer plant it is customary to wash the coagulum and then to remove excess water. A dewatering screw, for example, may be used for mechanical separation of the water to provide the wet crumb with a moisture content of only 12 to 25%.

The expressions "fine reinforcing carbon black" and "fine high-abrasion reinforcing carbon black" are used herein in the usual limited sense as understood in the SBR rubber tire art, thereby covering HAF, ISAF or SAF carbon blacks while excluding SRF carbon blacks or the like.

It will be understood that the above description is by way of illustration rather than limitation and that in accordance with the provisions of the patent statutes, variations and modifications of the specific methods described herein may be made without departing from the spirit of the invention.

Having described our invention, we claim:

1. In a multi-stage process of making a vulcanizable tire tread composition comprising 100 parts by weight of a copylymer of a major portion of butadiene and a minor portion of styrene having a raw Mooney viscosity of at least 100, 30 to 90 parts of fine reinforcing carbon black having a surface area of about 60 to 180 square meters per gram, about 5 to 60 parts of a compatible plasticizing oil, about 2 to 8 parts of zinc oxide, about 1 to 3 parts of stearic acid, less than 5 parts of an antioxidant, a vulcanization acclerator, and about 1 to 4 parts of sulfur, said composition being formed from a wet rubber crumb comprising a coagulum of said copolymer whose moisture content was reduced at least 50% by mechanical separation of water therefrom, said tire tread composition being formed by reducing the moisture content of said wet crumb to below 2%, mixing said fine reinforcing carbon black with the rubber in the first mixing stage of an internal mixer, thereafter cooling the rubber mixture and mixing the sulfur and accelerator with the rubber in a later mixing stage to produce said vulcanizable tire tread composition, the improvement which comprises:

mixing said fine reinforcing carbon black with said wet crumb in said mixer during the first mixing stage while the moisture content of the rubber is about 5 to about 15%, adding compounding ingredients of said rubber composition to the wet crumb before the carbon black is completely dispersed in the rubber, subjecting the rubber mixture to mastication and an intense shearing action in the closed receptacle of said mixer at a rotor speed of 50 to 150 revolutions per minute and a pressure of about 60 to 120 pounds per square inch to disperse the carbon black and the compounding ingredients, to increase the temperature to 320° to 375° F. and to reduce the moisture content of the rubber to less than 1% at the end of the first mixing stage, cooling the rubber mixture, and thereafter adding and dispersing the sulfur and accelerator to complete the tire tread composition during a second and final mixing cycle, essentially all of the compounding ingredients of said composition, except the sulfur and accelerator, being added before the end of the first mixing cycle.

2. A two-stage process for making a vulcanizable synthetic rubber tire tread composition from a wet crumb formed by polymerizing in aqueous emulsion a material containing a major portion of butadiene and a minor portion of styrene, forming a coagulum from the resulting polymer, and mechanically separating a portion of the water from the coagulum to reduce its moisture content at least 50%, said two-stage process comprising the steps of subjecting said crumb to mastication and an intense shearing action in a closed receptacle of an internal mixer having a rotor speed of about 50 to 150 revolutions per minute while heating said receptacle with steam and maintaining a pressure in the receptacle of about 60 to 120 pounds per square inch to evaporate the water in said crumb, to increase the temperature to about 320° to 375° F. and to reduce the moisture content to less than 1% in a first mixing stage, adding 30 to 90 parts of fine reinforcing furnace carbon black per 100 parts by weight of said polymer to the rubber crumb during said first stage while the moisture content is at least 5%, adding compounding ingredients including zinc oxide and stearic acid to the rubber during said first stage while the moisture content is less than 15%, cooling the dried rubber composition, and thereafter mixing sulfur and an accelerator to the rubber to form a vulcanizable rubber composition in a second and final stage of mastication, essentially all of the compounding ingredients except the curatives being incorporated before the end of the first mixing stage.

3. A two-stage process for making a high quality vulcanizable tire tread composition from a wet rubber crumb comprising a coagulum of a rubbery copolymer of a major portion of butadiene and a minor portion of styrene which coagulum had its moisture content reduced to less than 20 percent by mechanical separation of water therefrom without oven drying, said composition comprising 100 parts by weight of the rubber copolymer and compounding ingredients comprising 30 to 90 parts of fine reinforcing carbon black having a surface area of about 60 to 180 square meters per gram, about 5 to 60 parts of a compatible plasticizing oil, about 2 to 8 parts of zinc oxide, about 1 to 3 parts of stearic acid, less than 5 parts of an antioxidant, a vulcanization accelerator, and about 1 to 4 parts of sulfur, said process comprising: masticating said wet rubber crumb in a Banbury mixer under a pressure of about 60 to 120 pounds per square inch and at a rotor speed of about 50 to 150 revolution per minute while heating the mixer to increase the temperature to about 320° to 375° F. and to reduce the moisture content to less than 1 percent in less than 6 minutes in a first mixing and drying stage; adding 30 to 90 parts of said fine reinforcing carbon black to said mixer while the moisture content of the wet crumb is at least 5 percent and continuing said mastication; incorporating essentially all of the compounding ingredients, except the sulfur and accelerator, in the rubber before the end of said first mixing stage; reducing the temperature of the rubber composition at the end of the first mixing cycle; and thereafter mixing the sulfur and accelerator with the rubber to complete the vulcanizable rubber composition in a second and final mixing stage.

4. A pneumatic rubber tire having an improved tread with high abrasion resistance formed of a rubber composition comprising 100 parts by weight of a butadiene-styrene copolymer formed from a major portion of butadiene and having a raw Mooney viscosity of at least 100, about 30 to 90 parts of fine reinforcing carbon black having a surface area of about 60 to 180 square meters per gram, about 2 to 8 parts of zinc oxide, about 1 to 3 parts of stearic acid, about 1 to 5 parts of an antioxidant, and at least 5 parts of a compatible hydrocarbon oil sufficient to reduce the compounded Mooney viscosity to about 40 to 90, said rubber composition being characterized by being formed in two mixing stages by dispersing the carbon black in a wet rubber crumb while masticating the wet crumb in an internal mixer to reduce the moisture content of the crumb below 2% and to raise the temperature of the crumb substantially above the boiling point of water, said crumb comprising a butadiene-styrene coagulum which has a portion of the water mechanically removed therefrom and having a moisture content of at least 5 percent when the carbon black is added thereto, adding the zinc oxide, the stearic acid, the antioxidant, and the hydrocarbon oil to the wet crumb during the mastication in said mixer after the temperature is above 220° F. and before the end of the drying cycle, cooling the resulting masterbatch, and thereafter mixing sulfur and an accelerator with the masterbatch to form the vulcanizable tire tread composition.

5. A masterbatch composition for a pneumatic rubber tire tread comprising 100 parts by weight of a copolymer of a major portion of butadiene and a minor portion of styrene having a raw Mooney viscosity of at least 100, about 30 to 90 parts of fine reinforcing furnace carbon black with a surface area of about 60 to 180 square meters per gram, about 2 to 8 parts of zinc oxide, about 1 to 3 parts of stearic acid, up to 5 parts of an antioxidant, and about 5 to 60 parts of a compatible hydrocarbon oil, said masterbatch composition having a compounded Mooney viscosity of about 40 to 90 and being characterized by being formed in only one mixing stage by adding the fine reinforcing carbon black to a wet rubber crumb in a Banbury mixer while the moisture content is about 5 to 15 percent, said crumb comprising a butadiene-styrene coagulum which has a portion of the water mechanically removed therefrom, masticating the mixture of crumb and carbon black in said mixer while maintaining a rotor speed of 50 to 150 revolutions per minute and a pressure of 60 to 120 pounds per square inch to reduce the moisture content to no more than 1 percent and to raise the temperature to about 320° to 375° F., and adding the zinc oxide, the stearic acid and the hydrocarbon oil to the Banbury mixer during the same mixing cycle before the temperature of the rubber is reduced.

6. A tire tread composition comprising 100 parts by weight of a butadiene-styrene copolymer having a raw Mooney viscosity of at least 100, 40 to 80 parts of fine reinforcing furnace carbon black, about 2 to 8 parts of zinc oxide, about 1 to 3 parts of stearic acid, about 1 to 5 parts of an antioxidant, about 1 to 4 parts of sulfur, about 0.4 to 2 parts of an accelerator, and at least 5 parts of a compatible liquid plasticizer sufficient to reduce the compounded Mooney viscosity to about 40 to 90, said rubber composition being formed from a wet crumb comprising a butadiene-styrene coagulum having a portion of the water mechanically removed therefrom, removing the remainder of the water by mastication of the crumb, dispersing all of the compounding ingredients except the sulfur, and accelerator during said mastication, continuing the mastication until the temperature of the rubber is at least 320° F. and the moisture content is less than 2%, cooling the rubber composition, and thereafter adding the sulfur and accelerator and masticating the curable rubber composition while maintaining the temperature below the vulcanization temperature.

7. A method of making a tire tread composition having improved abrasion resistance in only two mixing stages comprising the steps of mixing a wet crumb containing 100 parts by weight of a butadiene-styrene copolymer with a raw Mooney viscosity of at least 100 and having a moisture content of about 5 to about 15% with about 2 to 8 parts of zinc oxide, about 1 to 3 parts of stearic acid, about 40 to 80 parts of fine reinforcing furnace carbon black, up to 5 parts of an antioxidant, and at least 5 parts of a compatible hydrocarbon oil to provide a rubber composition with a compounded Mooney viscosity of about 40 to 90, masticating the resulting mixture to disperse the carbon black and to raise the temperature of the mixture above 320° F., allowing the mixture to cool, and thereafter adding about 1 to 4 parts of sulfur and about 0.4 to 2 parts of a vulcanization accelerator to form said tire tread composition.

References Cited by the Examiner

UNITED STATES PATENTS

| | | | |
|---|---|---|---|
| 2,181,426 | 11/1939 | Goll et al. | 260—754 |
| 2,359,354 | 10/1944 | Campbell | 260—767 |
| 2,820,837 | 1/1958 | Smith | 260—763 |
| 2,854,426 | 9/1958 | Dasher | 260—41.5 |
| 2,904,527 | 9/1959 | Garwin | 260—33.6 |
| 2,964,083 | 12/1960 | Pfau et al. | 260—33.6 |
| 2,993,023 | 7/1961 | Pfau et al. | 260—33.6 |

LEON J. BERCOVITZ, *Primary Examiner.*

R. A. WHITE, *Assistant Examiner.*